(12) United States Patent
Li

(10) Patent No.: US 12,328,425 B2
(45) Date of Patent: Jun. 10, 2025

(54) VIDEO CODING METHOD AND VIDEO DECODING METHOD

(71) Applicant: Tencent Technology (Shenzhen) Company Limited, Guangdong (CN)

(72) Inventor: Dalong Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 935 days.

(21) Appl. No.: 17/387,594

(22) Filed: Jul. 28, 2021

(65) Prior Publication Data

US 2021/0360047 A1 Nov. 18, 2021

Related U.S. Application Data

(63) Continuation of application No. PCT/CN2020/090143, filed on May 14, 2020.

(30) Foreign Application Priority Data

May 22, 2019 (CN) .......................... 201910426978.7

(51) Int. Cl.
*H04N 19/00* (2014.01)
*G06T 9/00* (2006.01)
(Continued)

(52) U.S. Cl.
CPC .............. *H04N 19/00* (2013.01); *G06T 9/00* (2013.01); *H04L 65/612* (2022.05);
(Continued)

(58) Field of Classification Search
CPC .... H04N 19/00; H04N 19/587; H04N 21/234; H04L 65/612; H04L 65/70; G06T 9/00; G06T 2207/10016; G06T 2207/20021
See application file for complete search history.

(56) References Cited

U.S. PATENT DOCUMENTS 9,621,930 B2 * 4/2017 Noh ..................... H04N 19/177
10,425,661 B2 9/2019 Stepin et al.
(Continued)

FOREIGN PATENT DOCUMENTS

CN 1756358 A 4/2006
CN 102006479 A 4/2011
(Continued)

OTHER PUBLICATIONS

International Search Report and Written Opinion for priority application No. PCT/CN2020/090143, dated Aug. 12, 2020, 10p, in Chinese Language.
(Continued)

*Primary Examiner* — Manav Seth
(74) *Attorney, Agent, or Firm* — Crowell & Moring LLP

(57) ABSTRACT

This application relates to a video encoding method, computer-readable storage medium, and computer device. The method includes: obtaining video data, the video data including a plurality of original video images; processing the video data according to a sequence generation rule to obtain a plurality of independent subsequence video image groups, each of the subsequence video image groups including subsequence images corresponding to the sequence generation rule; obtaining encoding manners corresponding to the subsequence video image groups; and independently encoding the corresponding subsequence video image groups according to the encoding manners to obtain subsequence video encoded data corresponding to each of the subsequence video image groups.

17 Claims, 14 Drawing Sheets

(51) Int. Cl.
  *H04L 65/612* (2022.01)
  *H04N 19/587* (2014.01)
  *H04N 21/234* (2011.01)
  *H04L 65/70* (2022.01)

(52) U.S. Cl.
  CPC ......... *H04N 19/587* (2014.11); *H04N 21/234* (2013.01); *G06T 2207/10016* (2013.01); *G06T 2207/20021* (2013.01); *H04L 65/70* (2022.05)

(56) References Cited

U.S. PATENT DOCUMENTS

| | | | |
|---|---|---|---|
| 10,869,048 B2 | 12/2020 | Mao et al. | |
| 10,951,818 B2* | 3/2021 | Wang | H04N 19/46 |
| 12,003,701 B2* | 6/2024 | Wang | G06T 19/006 |
| 2006/0050787 A1* | 3/2006 | Winger | H04N 19/30 375/E7.088 |
| 2014/0213353 A1* | 7/2014 | Lee | A63F 13/12 463/31 |
| 2018/0324355 A1* | 11/2018 | Wang | H04N 21/816 |
| 2020/0099968 A1* | 3/2020 | Zhu | H04N 21/2383 |
| 2020/0128271 A1* | 4/2020 | Tanner | H04N 19/31 |
| 2020/0177913 A1* | 6/2020 | Zhu | H04N 19/587 |
| 2020/0382793 A1 | 12/2020 | Gao et al. | |

FOREIGN PATENT DOCUMENTS

| | | |
|---|---|---|
| CN | 102724560 A | 10/2012 |
| CN | 105103554 A | 11/2015 |
| CN | 108521869 A | 9/2018 |
| CN | 108848381 A | 11/2018 |
| CN | 108924592 A | 11/2018 |
| CN | 109068169 A | 12/2018 |
| CN | 109151481 A | 1/2019 |
| CN | 110049336 A | 7/2019 |
| WO | WO 2004/112398 A1 | 12/2004 |
| WO | WO 2020/233483 A1 | 11/2020 |

OTHER PUBLICATIONS

English language translation of the International Search Report for priority application No. PCT/CN2020/090143, dated August 12, 2020, 3p.

First Office Action and Search Report for Chinese application No. CN 201910426978.7, dated Dec. 13, 2019, 8p, in Chinese Language.

Second Office Action and Search Report for Chinese application No. CN 2019104269787, dated April 22, 2020, 5p, in Chinese language.

* cited by examiner

VIDEO CODING METHOD AND VIDEO DECODING METHOD

RELATED APPLICATION

This application is a continuation of PCT Application No. PCT/CN2020/090143, entitled "VIDEO CODING METHOD AND VIDEO DECODING METHOD" and filed May 14, 2020, which claims priority to Chinese Patent Application No. 201910426978.7, entitled "VIDEO ENCODING METHOD AND VIDEO DECODING METHOD" and filed on May 22, 2019. The above applications are incorporated herein by reference in their entireties.

TECHNICAL FIELD

This application relates to the field of computer technologies, and in particular, to a video encoding method, apparatus, computer-readable storage medium, and computer device, and a video decoding method, apparatus, computer-readable storage medium, and computer device.

BACKGROUND

With the development of computer technologies, videos are applied to increasingly wide scenarios. In different usage scenarios, output image resolution, bit rate, and other configurations are different. A conventional video encoder encodes each frame of original video data according to different output image resolutions and bit rates to obtain bit streams corresponding to the different output image resolutions and bit rates. When a network status changes, a current link needs to be disconnected, and a new bit stream is requested. In this case, the video encoder needs to perform re-encoding according to the re-requested output image resolution and bit rate, leading to video freezing and buffering.

SUMMARY

To resolve the foregoing technical problems, a video encoding method, apparatus, computer-readable storage medium, and computer device, and a video decoding method, apparatus, computer-readable storage medium, and computer device are provided, which can adaptively adjust video quality according to a network status to ensure smoothness of video playing in a case of limited bandwidth.

A video encoding method is provided, applicable to a computer device, the method including:
  obtaining video data, the video data including a plurality of original video images;
  processing the video data according to a sequence generation rule to obtain a plurality of subsequence video image groups, each of the subsequence video image groups including subsequence images extracted from the original video images according to the sequence generation rule;
  obtaining encoding manners corresponding to the subsequence video image groups; and
  encoding the corresponding subsequence video image groups according to the encoding manners to obtain corresponding subsequence video encoded data of the subsequence video image groups.

A video encoding apparatus is provided, including:
  a video data obtaining module, configured to obtain video data, the video data including a plurality of original video images;
  a video data processing module, configured to process the video data according to a sequence generation rule to obtain a plurality of subsequence video image groups, each of the subsequence video image groups including subsequence images extracted from the original video images according to the sequence generation rule;
  an encoding manner obtaining module, configured to obtain encoding manners corresponding to the subsequence video image groups; and
  a subsequence video image group encoding module, configured to encode the corresponding subsequence video image groups according to the encoding manners to obtain subsequence video encoded data corresponding to each of the subsequence video image groups.

A computer device is provided, including a memory, a processor, and a computer program stored in the memory and executable by the processor, the processor, when executing the program, performing the following operations:
  obtaining video data, the video data including a plurality of original video images;
  processing the video data according to a sequence generation rule to obtain a plurality of subsequence video image groups, each of the subsequence video image groups including subsequence images extracted from the original video images according to the sequence generation rule;
  obtaining encoding manners corresponding to the subsequence video image groups; and
  encoding the corresponding subsequence video image groups according to the encoding manners to obtain corresponding subsequence video encoded data of the subsequence video image groups.

A non-transitory computer-readable storage medium is provided, storing a computer program, the computer program, when executed by a processor, causing the processor to perform the following operations:
  obtaining video data, the video data including a plurality of original video images;
  processing the video data according to a sequence generation rule to obtain a plurality of subsequence video image groups, each of the subsequence video image groups including subsequence images extracted from the original video images according to the sequence generation rule;
  obtaining encoding manners corresponding to the subsequence video image groups; and
  encoding the corresponding subsequence video image groups according to the encoding manners to obtain corresponding subsequence video encoded data of the subsequence video image groups.

In the foregoing video encoding method, apparatus, non-transitory computer-readable storage medium, and computer device, the video data is processed according to the sequence generation rule to obtain the plurality of independent subsequence video image groups, and each of the subsequence video image groups includes the subsequence images corresponding to the sequence generation rule. During encoding, each of the independent subsequence video image groups is independently encoded according to the corresponding encoding manner, and the subsequence video image groups do not interfere with each other and have no dependence on each other during the encoding. The video data is processed according to the sequence generation rule to obtain the plurality of independent subsequence video image groups, and contents of the subsequence images in the subsequence video image groups are non-overlapping. Therefore, complete encoding needs to be performed on the video data only once, and there is no redundancy in encoding operations and storage. Further, an amount of subsequence video encoded data can be adaptively adjusted according to a network status, thereby avoiding quality problems of buffering, freezing, or stopping during playing by a decoder caused by changes in the network status, and improving the smoothness of video playing.

A video decoding method is provided, applicable to a computer device, the method including:

receiving target encoded data returned by a video transmitting terminal according to a network status, the target encoded data including subsequence video encoded data corresponding to subsequence video image groups, a total quantity of the subsequence video image groups being determined according to the network status;

decoding the subsequence video encoded data corresponding to the subsequence video image groups to obtain subsequence decoded video frames corresponding to each of the subsequence video image groups; and stitching the subsequence decoded video frames corresponding to the subsequence video image groups to obtain a corresponding target decoded video frame sequence.

In an embodiment, the receiving target encoded data returned by a video transmitting terminal according to a network status of a video requesting terminal includes:

transmitting a video request to the video transmitting terminal, the video request carrying a requested subsequence quantity determined according to the network status, so that the video transmitting terminal selects target subsequence video image groups corresponding to the requested subsequence quantity and combines subsequence video encoded data corresponding to the target subsequence video image groups to generate target encoded data; and receiving the target encoded data returned by the video transmitting terminal.

In an embodiment, the receiving target encoded data returned by a video transmitting terminal according to a network status of a video requesting terminal includes:

transmitting a video request to the video transmitting terminal, the video request carrying a requested subsequence quantity determined according to the network status of the video requesting terminal, so that the video transmitting terminal adjusts the requested subsequence quantity according to a current network status, selects target subsequence video image groups corresponding to the adjusted requested subsequence quantity, and combines subsequence video encoded data corresponding to the target subsequence video image groups to generate target encoded data; and receiving the target encoded data returned by the video transmitting terminal.

A video decoding apparatus is provided, including:

a target encoded data receiving module, configured to receive target encoded data returned by a video transmitting terminal according to a network status of a video requesting terminal, the target encoded data including subsequence video encoded data corresponding to subsequence video image groups, a total quantity of the subsequence video image groups being determined according to the network status;

an encoded data decoding module, configured to decode the subsequence video encoded data corresponding to the subsequence video image groups to obtain subsequence decoded video frames corresponding to each of the subsequence video image groups; and a video frame stitching module, configured to stitch the subsequence decoded video frames corresponding to the subsequence video image groups to obtain a corresponding target decoded video frame sequence.

A computer device is provided, including a memory, a processor, and a computer program stored in the memory and executable by the processor, the processor, when executing the program, performing the following operations:

receiving target encoded data returned by a video transmitting terminal according to a network status of a video requesting terminal, the target encoded data including subsequence video encoded data corresponding to subsequence video image groups, a total quantity of the subsequence video image groups being determined according to the network status;

decoding the subsequence video encoded data corresponding to the subsequence video image groups to obtain subsequence decoded video frames corresponding to each of the subsequence video image groups; and stitching the subsequence decoded video frames corresponding to the subsequence video image groups to obtain a corresponding target decoded video frame sequence.

A non-transitory computer-readable storage medium stores a computer program, the computer program, when executed by a processor, causing the processor to perform the following operations:

receiving target encoded data returned by a video transmitting terminal according to a network status of a video requesting terminal, the target encoded data including subsequence video encoded data corresponding to subsequence video image groups, a total quantity of the subsequence video image groups being determined according to the network status;

decoding the subsequence video encoded data corresponding to the subsequence video image groups to obtain subsequence decoded video frames corresponding to each of the subsequence video image groups; and stitching the subsequence decoded video frames corresponding to the subsequence video image groups to obtain a corresponding target decoded video frame sequence.

In the foregoing video decoding method, apparatus, computer-readable storage medium, and computer device, the target encoded data returned by the video transmitting terminal according to the network status of the video requesting terminal is received, where the target encoded data includes the subsequence video encoded data corresponding to the subsequence video image groups, and the total quantity of the subsequence video image groups matches the network status; the subsequence video encoded data corresponding to the subsequence video image groups is independently decoded to obtain the subsequence decoded video frames corresponding to each of the subsequence video image groups; and the subsequence decoded video frames corresponding to the subsequence video image groups are stitched to obtain the corresponding target decoded video frame sequence. Therefore, during video decoding, the matched target encoded data can be returned according to the network status of the video requesting terminal, to prevent the video requesting terminal from being affected by the network status and avoid quality problems of buffering, freezing, or stopping during playing, thereby ensuring the smoothness of video playing in the video requesting terminal. Moreover, the subsequence video image groups in the target encoded data can be decoded independently without interfering with each other, which can improve video decoding efficiency.

DESCRIPTION OF EMBODIMENTS

To make objectives, technical solutions, and advantages of this application clearer and more comprehensible, this application is further described in detail with reference to the accompanying drawings and embodiments. It is to be understood that the specific embodiments described herein are only used for explaining this application, and are not used for limiting this application.

Figure 1:
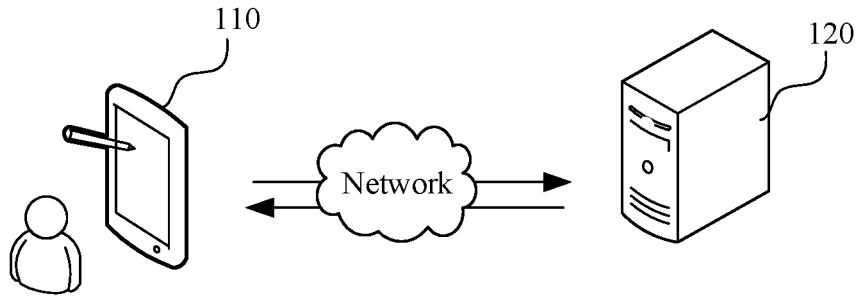
FIG. 1 is a diagram of an application environment of a video encoding method or a video decoding method according to an embodiment.

FIG. 1 is a diagram of an application environment of a video encoding method according to an embodiment. Referring to FIG. 1, the video encoding method is applied to a video encoding system. The video encoding system includes a terminal 110 and a server 120. The terminal 110 and the server 120 are connected by a network. The terminal 110 may be specifically a desktop terminal or a mobile terminal, where the mobile terminal may be specifically a mobile phone, a tablet computer, a notebook computer, or the like. The server 120 may be implemented by using an independent server or a server cluster that includes a plurality of servers. The terminal 110 may be a video requesting terminal configured to transmit acquired video data to a video transmitting terminal. The server 120 may be a video transmitting terminal configured to receive the video data transmitted by the video requesting terminal, so as to encode the received video data.

Specifically, the terminal 110 may transmit the acquired video data including a plurality of original video images to the server 120. The server 120 processes the video data according to a sequence generation rule after obtaining the video data to obtain a plurality of independent subsequence video image groups, each of the subsequence video image groups including subsequence images corresponding to the sequence generation rule. The server 120 obtains encoding manners corresponding to the subsequence video image groups and independently encodes the corresponding subsequence video image groups according to the encoding manners to obtain subsequence video encoded data corresponding to each of the subsequence video image groups.

In another embodiment, FIG. 1 may also be a diagram of an application environment of a video decoding method. Referring to FIG. 1, the video decoding method is applied to a video decoding system. The video decoding system includes a terminal 110 and a server 120. The terminal 110 and the server 120 are connected by a network. The terminal 110 may be specifically a desktop terminal or a mobile terminal, where the mobile terminal may be specifically a mobile phone, a tablet computer, a notebook computer, or the like. The server 120 may be implemented by using an independent server or a server cluster that includes a plurality of servers. The server 120 may be a video transmitting terminal configured to return matched target encoded data according to a network status of a video requesting terminal. The terminal 110 may be a video requesting terminal configured to request the target encoded data from the video transmitting terminal and decode the target encoded data.

Specifically, the server 120 obtains the target encoded data according to the network status of the terminal 110 and returns the target encoded data to the terminal 110. The terminal 110 receives the target encoded data returned by the server 120, the target encoded data including subsequence video encoded data corresponding to subsequence video image groups, a total quantity of the subsequence video image groups matching the network status of the terminal 110. The terminal 110 independently decodes the subsequence video encoded data corresponding to the subsequence video image groups to obtain subsequence decoded video frames corresponding to each of the subsequence video image groups, and finally stitches the subsequence decoded video frames corresponding to the subsequence video image groups to obtain a corresponding target decoded video frame sequence. Further, the terminal 110 may play the target decoded video frame sequence.

Figure 2:
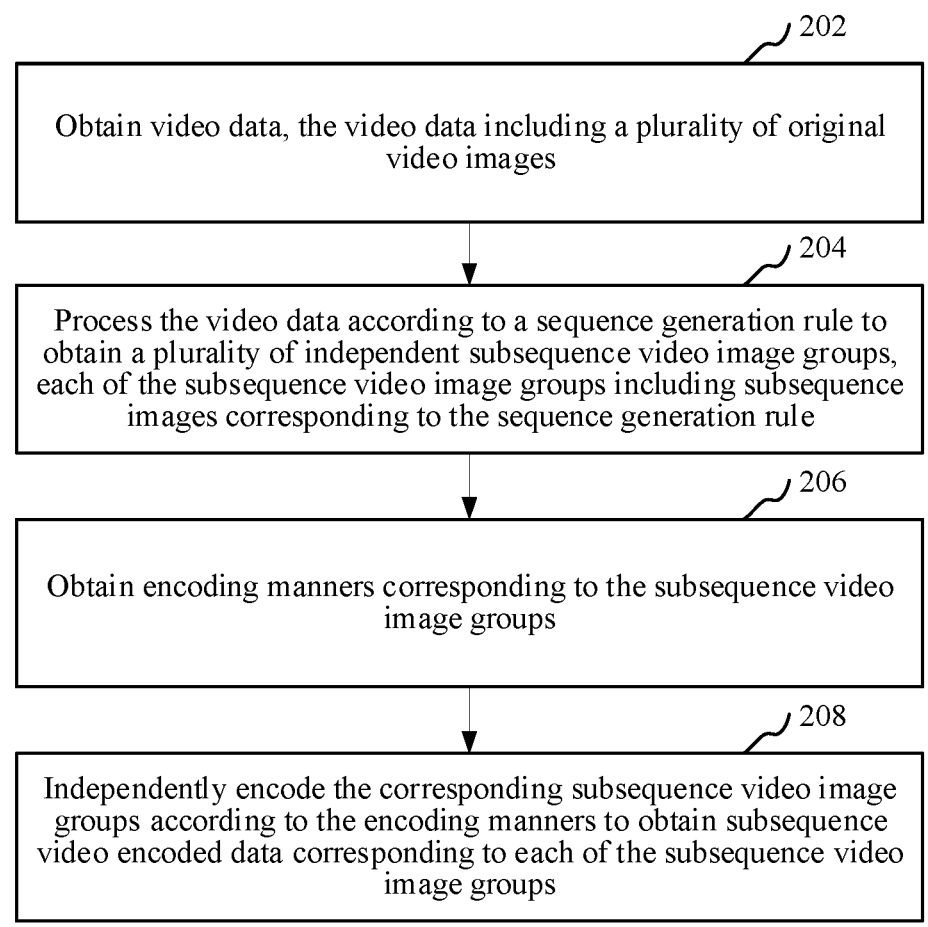
FIG. 2 is a schematic flowchart of a video encoding method according to an embodiment.

As shown in FIG. 2, in an embodiment, a video encoding method is provided. This embodiment is mainly described by using an example in which the method is applied to the terminal 110 or the server 120 in FIG. 1. Referring to FIG. 2, the video encoding method specifically includes the following steps.

Step 202. Obtain video data, the video data including a plurality of original video images.

The original video image is a unit that constitutes the video data. The video data may include a plurality of original video images. The original video images may be in the unit of frames. A frame is a picture in the video data. A frame is a picture, and a frame includes video data and corresponding audio data thereof. That is, the video data may include a plurality of frames of original video images. The original video images may be video frames of the video data. The video data may be an offline video file stored in the terminal or the server, or may be an online video file obtained by the terminal from the server.

For example, the video data may be an online video file obtained by the terminal 110 from the server 120. In this case, when a terminal user requests to play a specified video file through video software on the terminal 110, the terminal 110 may transmit the video playing request to the server 120 through a network, and the server 120 may return a playing address of the specified video file, so that the specified video data is played on the terminal 110. During the playing of the video data, the terminal 110 may obtain frames of the original video images in the video data in real time.

Step 204. Process the video data according to a sequence generation rule to obtain a plurality of independent subsequence video image groups, each of the subsequence video image groups including subsequence images corresponding to the sequence generation rule.

The sequence generation rule is used for generating independent subsequence video image groups according to video data. The sequence generation rule may be set in advance. The sequence generation rule includes, but is not limited to, a temporal generation rule and a spatial generation rule. The temporal generation rule may instruct the server to extract video data arranged in a timeline and dividing the video data to obtain independent subsequence video image groups. A division rule may be customized, under which the server may extract subsequence video images from the original video images in the video data according to an extraction interval and group subsequence video images extracted in the same extraction interval into an independent subsequence video image group. The customized division rule may alternatively instruct the server to determine, according to a preset sequence generation algorithm, a target subsequence video image group number to which each original video image in the video data belongs and group the corresponding original video images into subsequence video image groups corresponding to the target subsequence video image group numbers.

The spatial generation rule may be downsampling the original video images in the video data to obtain independent subsequence video image groups. A specific method may be customized, which may be downsampling each of the original video images in the video data to obtain a preset quantity of video subframes with the same resolution, determining video subframe numbers corresponding to the video subframes, and sequentially obtaining, according to an order of the original video images, video subframes with the same video subframe number corresponding to the original video images, to group into the same subsequence video image group, thereby obtaining a plurality of independent subsequence video image groups. The video subframe numbers of the video subframes in the same subsequence video image group may be the same video subframe number, or may be different video subframe numbers, which may be specifically set according to actual service requirements and service scenarios.

Specifically, first, the sequence generation rule is determined. When the sequence generation rule is the temporal generation rule, the subsequence video images are extracted from the original video images in the video data according to an extraction interval, and the subsequence video images extracted in the same extraction interval are grouped into one independent subsequence video image group. When the sequence generation rule is the spatial generation rule, each of the original video images in the video data is downsampled to obtain a preset quantity of video subframes with the same resolution; video subframe numbers corresponding to the video subframes are determined according to the same rule, and video subframes with the same video subframe number corresponding to the original video images are sequentially obtained according to an order of the original video images to group into the same subsequence video image group, thereby obtaining a plurality of independent subsequence video image groups.

Each of the subsequence video image groups includes subsequence images corresponding to the sequence generation rule. When the sequence generation rule is the temporal generation rule, the subsequence images may be images extracted from the original video images according to the extraction interval, and a resolution of the subsequence images is the same as a resolution of the original video images. When the sequence generation rule is the spatial generation rule, the subsequence images may be images obtained by downsampling the original video images, and a resolution of the subsequence images is lower than a resolution of the corresponding original video images before the downsampling.

Step 206. Obtain encoding manners corresponding to the subsequence video image groups.

Different subsequence video image groups have different encoding manners. Different subsequence video image groups may be encoded fully independently. The subsequence video image groups have no dependence on each other during the encoding. The encoding manner is a manner of encoding the subsequence video images in the subsequence video image group by a video encoder. The encoding manner includes, but is not limited to, a first encoding manner, a second encoding manner, or the like. Different encoding manners use different encoding algorithms to encode the subsequence video images in the subsequence video image group. Different encoding algorithms refer to different encoding parameters specified during encoding, such as different motion search ranges, different quantization parameters, different rate-distortion cost calculation methods, and different bit rate information. The video encoder is configured to encode the subsequence video images. The video encoder may be, but is not limited to, a physical video encoder, a software video encoder, and the like.

The corresponding encoding manner may be obtained through a group identifier of the subsequence video image group. Specifically, a relationship between the group identifiers of the subsequence video image groups and the corresponding encoding manners may be established in advance. When the subsequence video images in the subsequence video image groups need to be encoded, the corresponding encoding manners may be obtained according to the group identifiers of the subsequence video image groups. Then, the subsequence video images in the corresponding subsequence video image groups are encoded according to the encoding manners, so as to obtain corresponding encoded data. During encoding, each of the subsequence video image groups may be independently encoded through the corresponding encoding manner, and the subsequence video image groups do not interfere with each other, have no dependence on each other during the encoding, and can be encoded at the same time.

Step 208. Independently encode the corresponding subsequence video image groups according to the encoding manners to obtain subsequence video encoded data corresponding to each of the subsequence video image groups.

The subsequence video encoded data is related data generated when the video encoder encodes the subsequence video images. Specifically, after the encoding manners corresponding to the subsequence video image groups are obtained, the subsequence video images of the corresponding subsequence video image groups are encoded according to the encoding manners of the subsequence video image groups, so as to obtain the subsequence video encoded data corresponding to each of the subsequence video image groups. The encoding may include at least one of prediction, transformation, quantization, and entropy encoding.

When the corresponding subsequence video image groups are encoded according to the corresponding encoding manners, the subsequence video image groups are independent of each other. The subsequence video image groups do not affect each other or interfere with each other during the encoding. The encoding manners of the subsequence video image groups may be the same encoding manner, or may be different encoding manners.

Figure 2A:
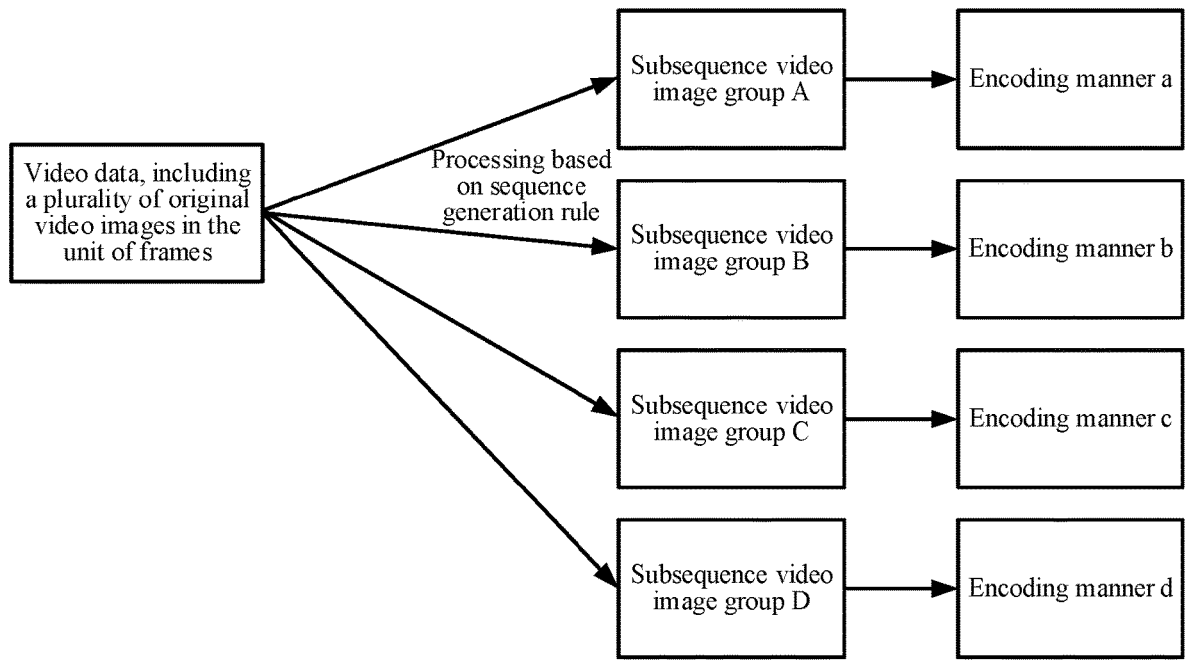
FIG. 2A is a schematic diagram of a principle of a video encoding method according to an embodiment.

In an embodiment, as shown in FIG. 2A, FIG. 2A is a schematic diagram of a principle of a video encoding method according to an embodiment. Video data including a plurality of original video images in the unit of frames is obtained. It is determined that a sequence generation rule is a temporal generation rule or a spatial generation rule. The video data is processed according to the sequence generation rule to obtain a plurality of independent subsequence video image groups, such as subsequence video image group A, subsequence video image group B, subsequence video image group C, and subsequence video image group D in FIG. 2A. Because encoding manners of different subsequence video image groups may be the same or different, the encoding manners corresponding to the subsequence video image groups are obtained, such as encoding manner a corresponding to the subsequence video image group A, encoding manner b corresponding to the subsequence video image group B, encoding manner c corresponding to the subsequence video image group C, and encoding manner d corresponding to the subsequence video image group D.

Finally, corresponding subsequence video images are independently encoded according to the encoding manners of the subsequence video image groups to obtain subsequence video encoded data corresponding to each of the subsequence video image groups. For example, the subsequence video images in the subsequence video image group A are encoded in the encoding manner a to obtain subsequence video encoded data corresponding to the subsequence video image group A. The subsequence video image groups are independent and have no dependence on each other during the encoding, and can be encoded at the same time, thereby improving efficiency of video encoding.

In the foregoing video encoding method, video data is processed according to a sequence generation rule to obtain a plurality of independent subsequence video image groups, and each of the subsequence video image groups includes subsequence images corresponding to the sequence generation rule. During encoding, each of the independent subsequence video image groups is independently encoded according to the corresponding encoding manner, and the subsequence video image groups do not interfere with each other and have no dependence on each other during the encoding. The video data is processed according to the sequence generation rule to obtain the plurality of independent subsequence video image groups, and contents of the subsequence images in the subsequence video image groups are non-overlapping. Therefore, complete encoding needs to be performed on the video data only once, and there is no redundancy in encoding operations and storage. Further, an amount of subsequence video encoded data can be adaptively adjusted according to a network status, thereby avoiding quality problems of buffering, freezing, or stopping during playing by a decoder caused by changes in the network status, and improving the smoothness of video playing.

Figure 3:
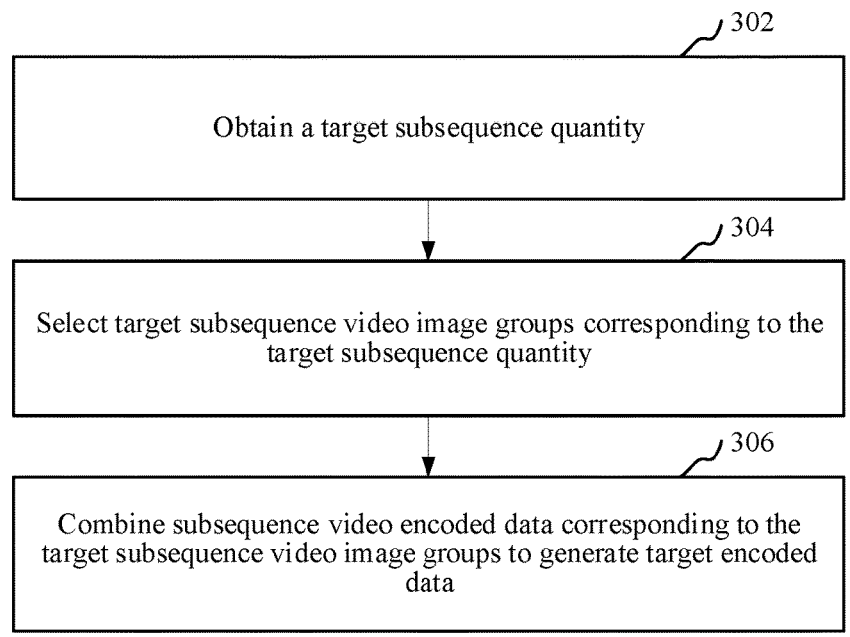
FIG. 3 is a schematic flowchart of a video encoding method according to another embodiment.

In an embodiment, as shown in FIG. 3, after the obtaining subsequence video encoded data corresponding to each of the subsequence video image groups, the method further includes the following steps:

Step 302. Obtain a target subsequence quantity.

The terminal or the server may be used as a video transmitting terminal for encoding the video data and transmitting target subsequence video encoded data to a video requesting terminal. The video requesting terminal is relative to the video transmitting terminal. The video requesting terminal is configured to transmit a video request to the video transmitting terminal. The video request carries a requested subsequence quantity. The video requesting terminal may determine the requested subsequence quantity according to a network status thereof and directly use the requested subsequence quantity as the target subsequence quantity. A better network status of the video requesting terminal indicates a larger requested subsequence quantity. Conversely, a worse network status of the video requesting terminal indicates a smaller requested subsequence quantity.

After the video transmitting terminal receives the video request transmitted by the video requesting terminal, where the video request carries the requested subsequence quantity, to ensure continuity of video playing, the video transmitting terminal may adjust the requested subsequence quantity according to a current network status thereof and use the adjusted requested subsequence quantity as the target subsequence quantity.

After the video transmitting terminal receives the video request transmitted by the video requesting terminal, where the video request carries the requested subsequence quantity, and the video transmitting terminal may also determine a network status of the video requesting terminal, adjust the requested subsequence quantity according to a result of the determination, and use the adjusted requested subsequence quantity as the target subsequence quantity.

Step 304. Select target subsequence video image groups corresponding to the target subsequence quantity.

Specifically, after obtaining the target subsequence quantity, the video transmitting terminal selects the target subsequence video image groups corresponding to the target subsequence quantity from the subsequence video encoded data corresponding to each of the subsequence video image groups. A selection method may be customized. Under the customized selection method, the video transmitting terminal may sequentially select the target subsequence video image groups corresponding to the target subsequence quantity according to the group identifiers of the subsequence video image groups. For example, if the target subsequence quantity is 3, subsequence video image group 1, subsequence video image group 2, and subsequence video image group 3 are selected as the target subsequence video image groups. Alternatively under the customized selection method, the video transmitting terminal may randomly select the target subsequence video image groups corresponding to the target subsequence quantity from the subsequence video encoded data corresponding to each of the subsequence video image groups. Alternatively under the customized selection method, the video transmitting terminal may select the target subsequence video image groups having subsequence video image group identifiers corresponding to the target subsequence video image group identifiers according to the target subsequence quantity (the number of subsequences). For example, if the target subsequence quantity is 3, and the target subsequence video image group identifier is an even identifier, subsequence video image group 2, subsequence video image group 4, and subsequence video image group 6 are selected as the target subsequence video image groups.

Step 306. Combine subsequence video encoded data corresponding to the target subsequence video image groups to generate target encoded data.

Specifically, after the target subsequence video image groups corresponding to the target subsequence quantity are selected, the subsequence video encoded data corresponding to the target subsequence video image groups is combined to generate the target encoded data. Because each of the subsequence video image groups is independently encoded, the subsequence video encoded data corresponding to the target subsequence video image groups may be combined according to the group identifiers of the subsequence video image groups to generate the target encoded data.

For example, there are two target subsequence video image groups: target subsequence video image group 0 and target subsequence video image group 1. The target subsequence video image group 0 includes three pieces of subsequence video encoded data, and the target subsequence video image group 1 includes three pieces of subsequence video encoded data. The target subsequence video image group 0 and the target subsequence video image group 1 are combined according to the group identifiers of the subsequence video image groups to generate the target encoded data. That is, the target encoded data includes the target subsequence video image group 0 and the target subsequence video image group 1. The target subsequence video image group 0 and the target subsequence video image group 1, while packaged together to generate the target encoded data, are still independent subsequence video image groups.

Figure 4:
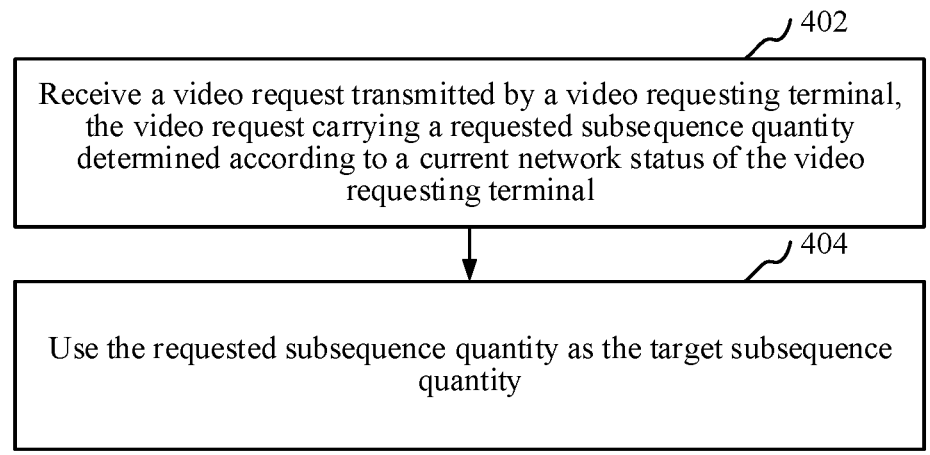
FIG. 4 is a schematic flowchart of obtaining a target subsequence quantity according to an embodiment.

In an embodiment, as shown in FIG. 4, the obtaining a target subsequence quantity includes the following steps:

Step 402. Receive a video request transmitted by a video requesting terminal, the video request carrying a requested subsequence quantity determined according to a network status of the video requesting terminal.

Step 404. Determine the requested subsequence quantity as the target subsequence quantity.

The video request is used for requesting matched target encoded data corresponding to the subsequence video image groups. The video requesting terminal may be triggered by a relevant application to generate the video request. The video request carries the requested subsequence quantity determined according to the network status (for example, the current network status) of the video requesting terminal. If the current network status of the video requesting terminal is good, the requested subsequence quantity carried in the video request is large. Conversely, if the current network status of the video requesting terminal is poor, the requested subsequence quantity carried in the video request is small. Therefore, the continuity of the video playing can be ensured, and it is avoided that the video requesting terminal fails to receive an amount of data due to the network status to cause suspension or freezing during playing.

Specifically, the video requesting terminal may determine the requested subsequence quantity according to the current network status thereof, add the requested subsequence quantity to the video request, and transmit the video request to the video transmitting terminal. After receiving the video request, the video transmitting terminal directly uses the requested subsequence quantity carried in the video request as the target subsequence quantity.

Figure 5:
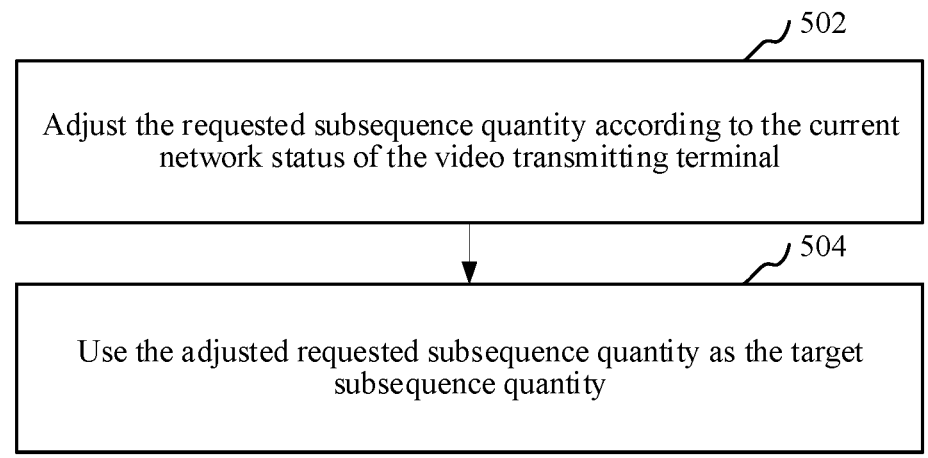
FIG. 5 is a schematic flowchart of obtaining a target subsequence quantity according to another embodiment.

In an embodiment, as shown in FIG. 5, the method shown in FIG. 4 further includes the following steps:

Step 502. Adjust the requested subsequence quantity according to the network status of the video transmitting terminal.

Step 504. Determine the adjusted requested subsequence quantity as the target subsequence quantity.

When receiving the video request transmitted by the video requesting terminal, the video transmitting terminal obtains the requested subsequence quantity carried in the video request. Because the requested subsequence quantity carried in the video request is determined according to the network status (for example, the current network status) of the video requesting terminal but not the network status (for example, the current network status) of the video transmitting terminal, if the network status of the video transmitting terminal changes, in order to ensure that the video requesting terminal can receive data and avoid problems in data transmission due to the network status of the video transmitting terminal, the network status of the video transmitting terminal needs to be considered.

Specifically, after receiving the video request transmitted by the video requesting terminal, the video transmitting terminal adjusts the requested subsequence quantity carried in the video request according to the current network status thereof. Specifically, if the current network status of the video transmitting terminal is good, the requested subsequence quantity carried in the video request may be directly used as the target subsequence quantity, and if the current network status of the video transmitting terminal is poor, the requested subsequence quantity carried in the video request is adjusted, for example, the requested subsequence quantity is reduced, and the adjusted requested subsequence quantity is used as the target subsequence quantity.

By considering the network status factors of the video transmitting terminal and the video requesting terminal, the requested subsequence quantity is adaptively adjusted according to the network status of the video transmitting terminal and the video requesting terminal, which can ensure the continuity of data transmission between the video transmitting terminal and the video requesting terminal, and prevent freezing or stopping during playing in the final playing process of the video requesting terminal.

In an embodiment, the sequence generation rule includes a temporal generation rule, and the subsequence images are images extracted from the original video images according to an extraction interval.

The sequence generation rule is used for generating independent subsequence video image groups according to video data. The sequence generation rule may be set in advance. The sequence generation rule includes, but is not limited to, a temporal generation rule and a spatial generation rule. The temporal generation rule may instruct the server to extract video data arranged in a timeline and dividing the video data to obtain independent subsequence video image groups. A division rule may be customized, under which the server may extract subsequence video images from the original video images in the video data according to an extraction interval and group subsequence video images extracted in the same extraction interval into an independent subsequence video image group. The extraction interval may be set according to actual service requirements or actual application scenarios.

The customized division rule may alternatively instruct the server to determine, according to a preset sequence generation algorithm, a target subsequence video image group number to which each original video image in the video data belongs and to group the corresponding original video images into subsequence video image groups corresponding to the target subsequence video image group numbers.

In an embodiment, the preset sequence generation algorithm may instruct the server to determine target subsequence image identifiers corresponding to each of the subsequence video image groups according to the total quantity of the subsequence video image groups and the group identifier corresponding to each of the subsequence video image groups and extract the subsequence images corresponding to each of the subsequence video image groups from the original video images according to the target subsequence image identifiers corresponding to each of the subsequence video image groups and frame identifiers corresponding to the original video images.

Figure 6:
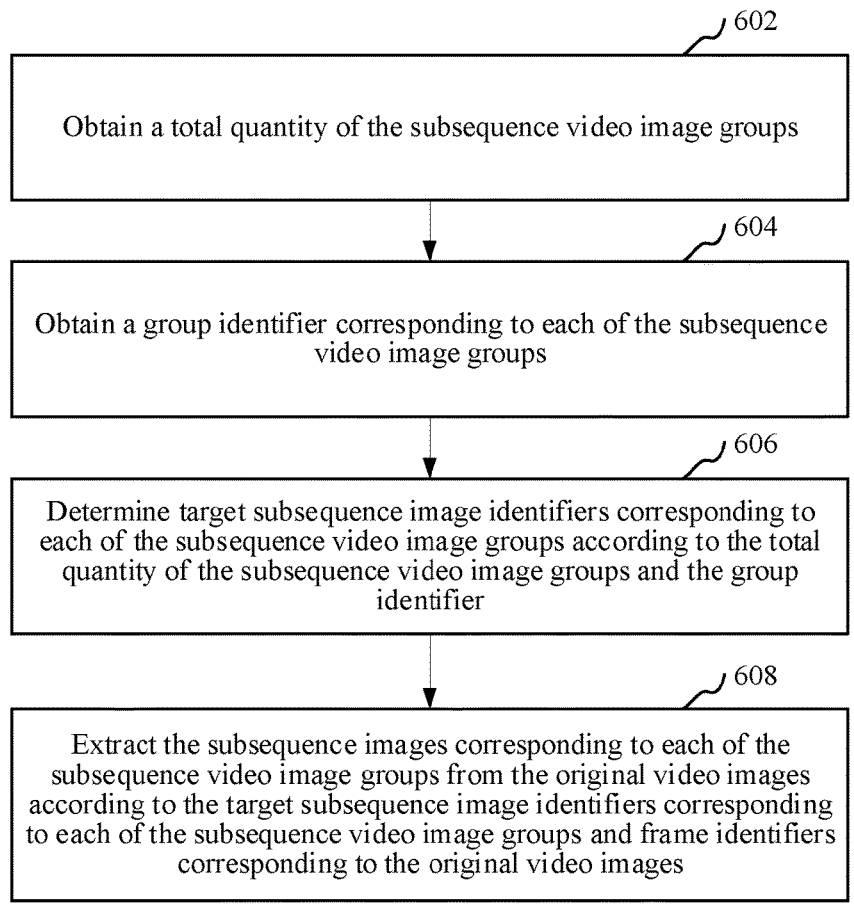
FIG. 6 is a schematic flowchart of a step of sequence generation rule processing according to an embodiment.

In an embodiment, as shown in FIG. 6, processing the video data according to a sequence generation rule to obtain a plurality of independent subsequence video image groups includes the following steps:

Step 602. Obtain a total quantity of the subsequence video image groups.

Step 604. Obtain a group identifier corresponding to each of the subsequence video image groups.

The quantity of the subsequence video image groups may be set in advance according to actual service requirements or actual application scenarios. If a more delicate and more scalable quality grade is required to be provided to adapt to changes in the network status, the quantity of the subsequence video image groups may be larger, and conversely, the quantity of the subsequence video image groups may be smaller.

Specifically, the preset total quantity of the subsequence video image groups is obtained, and the group identifier corresponding to each of the subsequence video image groups is obtained. The group identifier is used for uniquely identifying the subsequence video image group. An image group number may be set for each of the subsequence video image groups in advance, and the image group number is used as the corresponding group identifier. For example, the total quantity of the subsequence video image groups is set to 3 in advance, respectively subsequence video image group 0, subsequence video image group 1, and subsequence video image group 2. The group identifiers corresponding to the subsequence video image groups are 0, 1, and 2 respectively.

Step 606. Determine target subsequence image identifiers corresponding to each of the subsequence video image groups according to the total quantity of the subsequence video image groups and the group identifier corresponding to each of the subsequence video image groups.

Specifically, after the total quantity of the subsequence video image groups and the group identifier corresponding to each of the subsequence video image groups are obtained, the target subsequence image identifiers corresponding to each of the subsequence video image groups may be determined according to the total quantity of the subsequence video image groups and the group identifier corresponding to each of the subsequence video image groups. Specifically, the target subsequence image identifiers corresponding to each of the subsequence video image groups may be calculated by a preset formula according to the total quantity of the subsequence video image groups and the group identifier corresponding to each of the subsequence video image groups. The preset formula may be customized and set according to actual service requirements.

In an embodiment, the target subsequence image identifiers corresponding to each of the subsequence video image groups may be determined by the following formula:

$$y = \partial * M + N$$

where $\partial$ is a natural number, $N<M$, $N$ is the group identifier corresponding to each of the subsequence video image groups, $M$ is the total quantity of the subsequence video image groups, $y$ is the target subsequence image identifier, and $M$ and $N$ are positive integers.

For example, the total quantity $M$ of the subsequence video image groups is 3, and the group identifier of the subsequence video image group 0 is 0, when $\partial$ is 0, $0*3+0=0$; in this case, the $0^{th}$ frame of original video image in the video data is grouped into the subsequence video image group 0, and when $\partial$ is 1, $1*3+0=3$; in this case, the $3^{rd}$ frame of original video image in the video data is grouped into the subsequence video image group 0.

Step 608. Extract the subsequence images corresponding to each of the subsequence video image groups from the original video images according to the target subsequence image identifiers corresponding to each of the subsequence video image groups and frame identifiers corresponding to the original video images.

Specifically, after the target subsequence image identifiers corresponding to each of the subsequence video image groups are determined according to the total quantity of the subsequence video image groups and the group identifier, the subsequence images corresponding to each of the subsequence video image groups may be extracted from the original video images according to the target subsequence image identifiers corresponding to each of the subsequence video image groups and the frame identifiers corresponding to the original video images.

In an embodiment, the target subsequence image identifiers corresponding to each of the subsequence video image groups may be determined by the following formula:

$$y = \partial * M + N$$

where ∂ is a natural number, N<M, N is the group identifier corresponding to each of the subsequence video image groups, M is the total quantity of the subsequence video image groups, y is the target subsequence image identifier, and M and N are positive integers.

For example, the total quantity M of the subsequence video image groups is 3, and the group identifier of the subsequence video image group 0 is 0, when ∂ is 0, 0*3+0=0; in this case, the $0^{th}$ frame of original video image in the video data is grouped into the subsequence video image group 0; when ∂ is 1, 1*3+0=3; in this case, the $3^{rd}$ frame of original video image in the video data is grouped into the subsequence video image group 0. The $0^{th}$ frame and the $3^{rd}$ frame are the frame identifiers corresponding to the original video images.

Figure 6A:
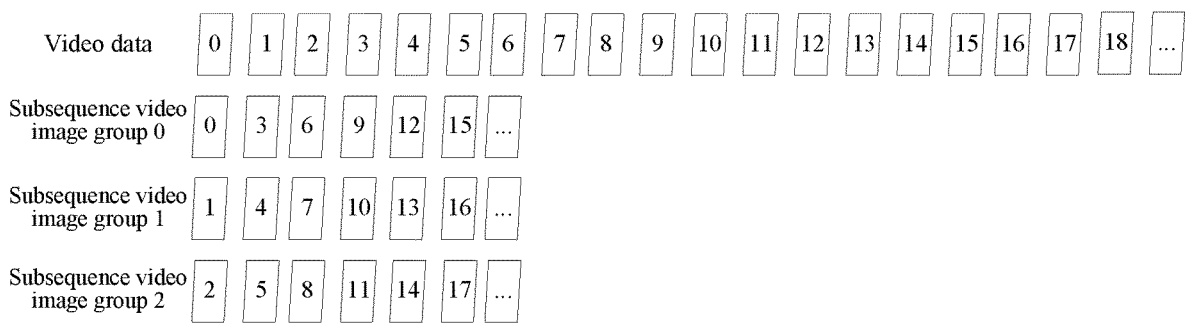
FIG. 6A is an exemplary diagram of a step of generating subsequence video image groups according to an embodiment.

Specifically, as shown in FIG. 6A, FIG. 6A is an exemplary diagram of a step of generating subsequence video image groups according to an embodiment. The video data includes a $0^{th}$ frame of original video image, a $1^{st}$ frame of original video image, a $2^{nd}$ frame of original video image, and the like. The three subsequence video image groups shown in FIG. 6A are subsequence video image group 0, subsequence video image group 1, and subsequence video image group 2. It is determined according to the foregoing formula that, the subsequence images corresponding to the subsequence video image group 0 are the $0^{th}$ frame of original video image, the $3^{rd}$ frame of original video image, the $6^{th}$ frame of original video image, the $9^{th}$ frame of original video image, the $12^{th}$ frame of original video image, the $15^{th}$ frame of original video image, and the like; the subsequence images corresponding to the subsequence video image group 1 are the $1^{st}$ frame of original video image, the $4^{th}$ frame of original video image, the $7^{th}$ frame of original video image, the $10^{th}$ frame of original video image, the $13^{th}$ frame of original video image, the $16^{th}$ frame of original video image, and the like; the subsequence images corresponding to the subsequence video image group 2 are the $2^{nd}$ frame of original video image, the $5^{th}$ frame of original video image, the $8^{th}$ frame of original video image, the $11^{th}$ frame of original video image, the $14^{th}$ frame of original video image, the $17^{th}$ frame of original video image, and the like.

In an embodiment, the sequence generation rule includes a spatial generation rule, and the subsequence images are images obtained by downsampling the original video images.

The sequence generation rule is used for generating independent subsequence video image groups according to video data. The sequence generation rule may be set in advance. The sequence generation rule includes, but is not limited to, a temporal generation rule and a spatial generation rule. The spatial generation rule may indicate the server to downsample the original video images in the video data to obtain independent subsequence video image groups. A specific method may be customized, under which the server may downsample each of the original video images in the video data to obtain a preset quantity of video subframes with the same resolution, where the resolution of the video subframes is lower than the resolution of the original video images before the downsampling. The server may determine video subframe numbers corresponding to the video subframes according to a preset rule, and sequentially obtain, according to an order of the original video images, video subframes with the same video subframe number corresponding to the original video images to group into the same subsequence video image group, thereby obtaining a plurality of independent subsequence video image groups. The video subframe numbers of the video subframes in the same subsequence video image group may be the same video subframe number, or may be different video subframe numbers, which may be specifically set according to actual service requirements and service scenarios.

Figure 7:
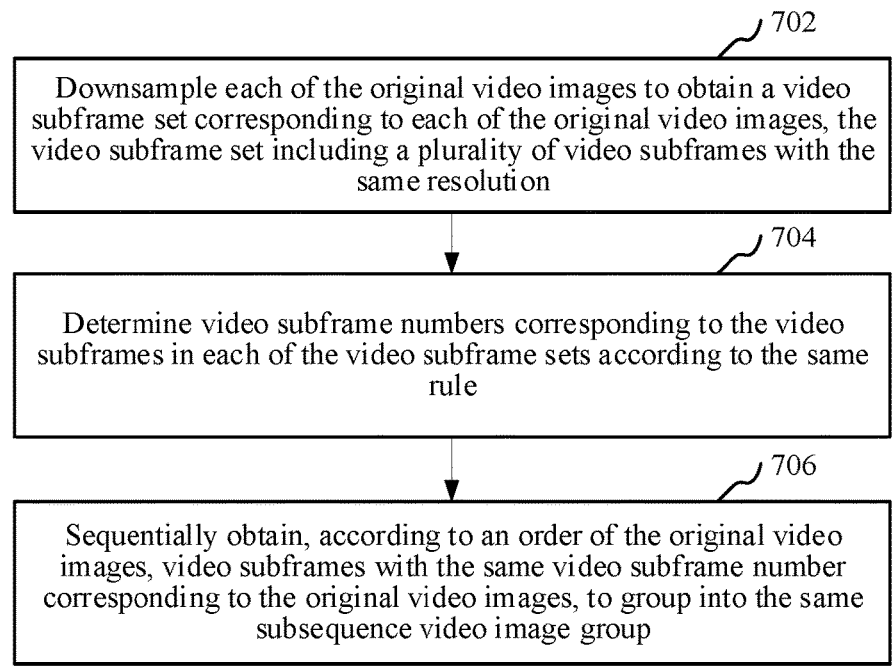
FIG. 7 is a schematic flowchart of a step of processing based on a sequence generation rule according to an embodiment.

In an embodiment, as shown in FIG. 7, the processing the video data according to a sequence generation rule to obtain a plurality of independent subsequence video image groups includes the following steps:

Step 702. Downsample each of the original video images to obtain a video subframe set corresponding to each of the original video images, the video subframe set including a plurality of video subframes with the same resolution.

The downsampling refers to downsampling the original video image to obtain corresponding video subframes. For example, when an original video image has a resolution of 800*800 pixels, in a processing manner of ½ downsampling in horizontal and vertical directions, video subframes obtained after the downsampling have a resolution of 400*400 pixels.

Specifically, each of the original video images is downsampled through a downsampling algorithm to obtain a preset quantity of video subframes with the same resolution corresponding to each of the original video images, and the video subframes corresponding to each of the original video images form a video subframe set. During the downsampling, a downsampling ratio may be set. The downsampling ratio may be obtained according to a capability of a processor of a device, such as a terminal or a server, performing the video encoding method. A device having a strong processor processing capability corresponds to a large downsampling ratio, and a device having a weak processor processing capability corresponds to a small downsampling ratio. A correspondence between processor processing capabilities and downsampling ratios may be set. When encoding needs to be performed, the processor processing capability is obtained, and the corresponding downsampling ratio is obtained according to the processor processing capability. For example, a downsampling ratio corresponding to a 16-bit processor may be set to ⅛, and a downsampling ratio corresponding to a 32-bit processor may be set to ¼.

Figure 7A:
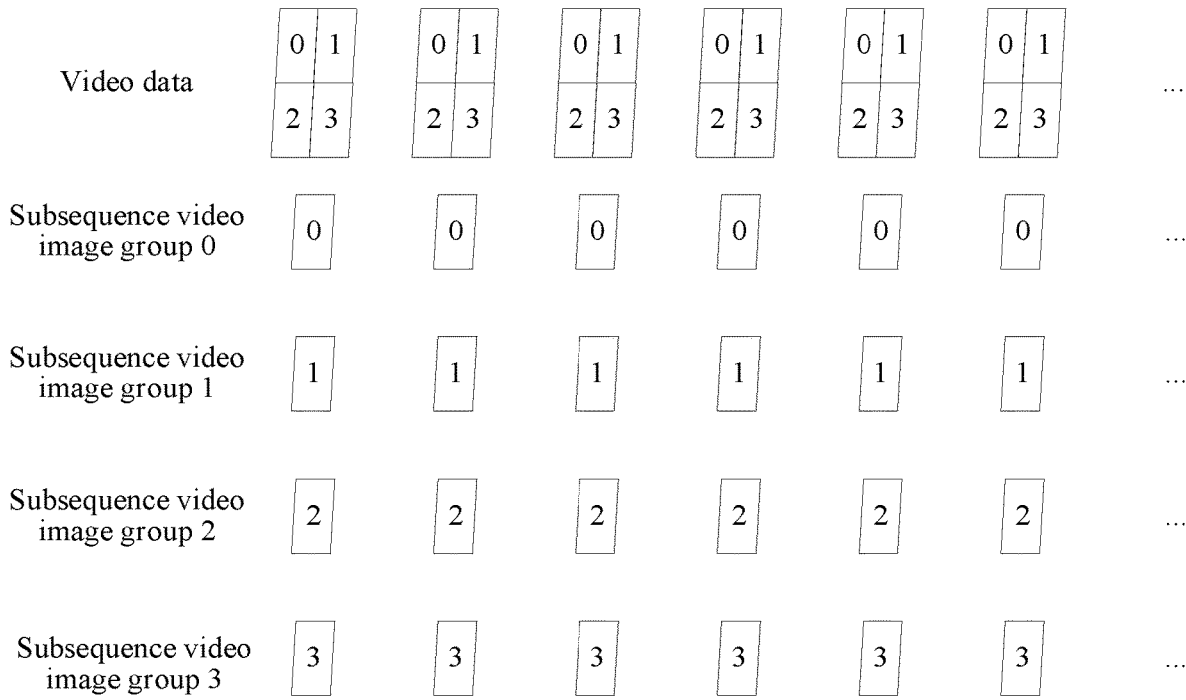
FIG. 7A is an exemplary diagram of a step of generating subsequence video image groups according to an embodiment.

In an embodiment, as shown in FIG. 7A, FIG. 7A is an exemplary diagram of a step of generating subsequence video image groups according to an embodiment. In FIG. 7A, each of the original video images is downsampled to obtain four video subframes with the same resolution, and the video subframes with the same resolution corresponding to each of the original video images form a video subframe set.

Step 704. Determine video subframe numbers corresponding to the video subframes in each of the video subframe sets according to the same rule.

The rule is used for determining a number of each video subframe in the video subframe set. The rule may be customized, and may be set according to actual service requirements or actual application scenarios. The customized rule may instruct the server to determine video subframe numbers corresponding to each of the original video images according to the quantity of video subframes in each video subframe set. Alternatively, the customized rule may instruct the server to determine, according to the quantity of video subframes corresponding to each of the original video images, video subframe numbers of the video subframes corresponding to each of the original video images.

Specifically, when each of the original video images is downsampled to obtain a preset quantity of video subframes corresponding to each of the original video images, the video subframe numbers corresponding to the video subframes of each of the original video images may be determined according to the same rule. For example, numbers may be sequentially assigned to the video subframes of each of the original video images, starting from 0, or alternatively, corresponding video subframe numbers may be assigned to the video subframes of each of the original video images. As shown in FIG. 7A, the $0^{th}$ frame of original video image is downsampled to obtain four video subframes with the same resolution, and the corresponding video subframe numbers are sequentially assigned to the video subframes, for example, No. 0 video subframe of the $0^{th}$ frame of original video image, No. 1 video subframe of the $0^{th}$ frame of original video image, No. 2 video subframe of the $0^{th}$ frame of original video image, and No. 3 video subframe of the $0^{th}$ frame of original video image. Similarly, the $1^{st}$ frame of original video image is downsampled to obtain four video subframes with the same resolution, and the corresponding video subframe numbers are sequentially assigned to the video subframes, for example, No. 0 video subframe of the $1^{st}$ frame of original video image, No. 1 video subframe of the $1^{st}$ frame of original video image, No. 2 video subframe of the $1^{st}$ frame of original video image, and No. 3 video subframe of the $1^{st}$ frame of original video image. Corresponding video subframe numbers are assigned to the video subframes of each of the original video images according to the same principle, as shown in FIG. 7A.

Step 706. Sequentially obtain, according to an order of the original video images, video subframes with the same video subframe number corresponding to the original video images, to group into the same subsequence video image group.

Specifically, after the video subframe numbers corresponding to the video subframes in each of the video subframe sets are determined according to the same rule, an order of the original video images is obtained. For example, the frame identifiers of the original video images are obtained, the order of the original video images may be determined according to the frame identifiers of the original video images, the video subframes with the same video subframe number corresponding to the original video images are sequentially obtained according to the order of the original video images, and the video subframes with the same video subframe number are grouped into the same subsequence video image group. A grouping manner may be customized. The customized grouping manner may instruct the server to randomly group video subframes with the same video subframe number into a subsequence video image group to ensure that the video subframes with the same video subframe number are grouped into the same subsequence video image group. Alternatively, the customized grouping manner may instruct the server to group video subframes with the same video subframe number into a corresponding target subsequence video image group. A specific manner of determining the target subsequence video image group may be customized and set according to actual service requirements or actual application scenarios. Alternatively, the customized grouping manner may instruct the server to sequentially group video subframes with the same video subframe number into a subsequence video image group according to the group identifier of the subsequence video image group to ensure that the video subframes with the same video subframe number are grouped into the same subsequence video image group.

In an embodiment, as shown in FIG. 7A, first, each of the original video images is downsampled to obtain four video subframes with the same resolution corresponding to each of the original video images, and the video subframe numbers corresponding to the video subframes of each of the original video images are determined according to the same rule. For example, the video subframe numbers corresponding to four video subframes of the 0th frame of original video image are 0-3, and the video subframe numbers corresponding to four video subframes of another frame of original video image are also 0-3. Then, the video subframes with the same video subframe number corresponding to the original video images are sequentially obtained according to the order of the original video images, and grouped into the same subsequence video image group. For example, No. 0 video subframe of the $0^{th}$ frame of original video image, No. 0 video subframe of the $1^{st}$ frame of original video image, No. 0 video subframe of the $2^{nd}$ frame of original video image, and the like are grouped into the same subsequence video image group according to the order of the original video images. For example, the video subframes with the video subframe number of 0 are grouped into the subsequence video image group with the subsequence video image group identifier of 0 according to the order of the original video images, the video subframes with the video subframe number of 1 are grouped into the subsequence video image group with the subsequence video image group identifier of 1 according to the order of the original video images, the video subframes with the video subframe number of 2 are grouped into the subsequence video image group with the subsequence video image group identifier of 2 according to the order of the original video images, the video subframes with the video subframe number of 3 are grouped into the subsequence video image group with the subsequence video image group identifier of 3 according to the order of the original video images, and the like.

Figure 8:
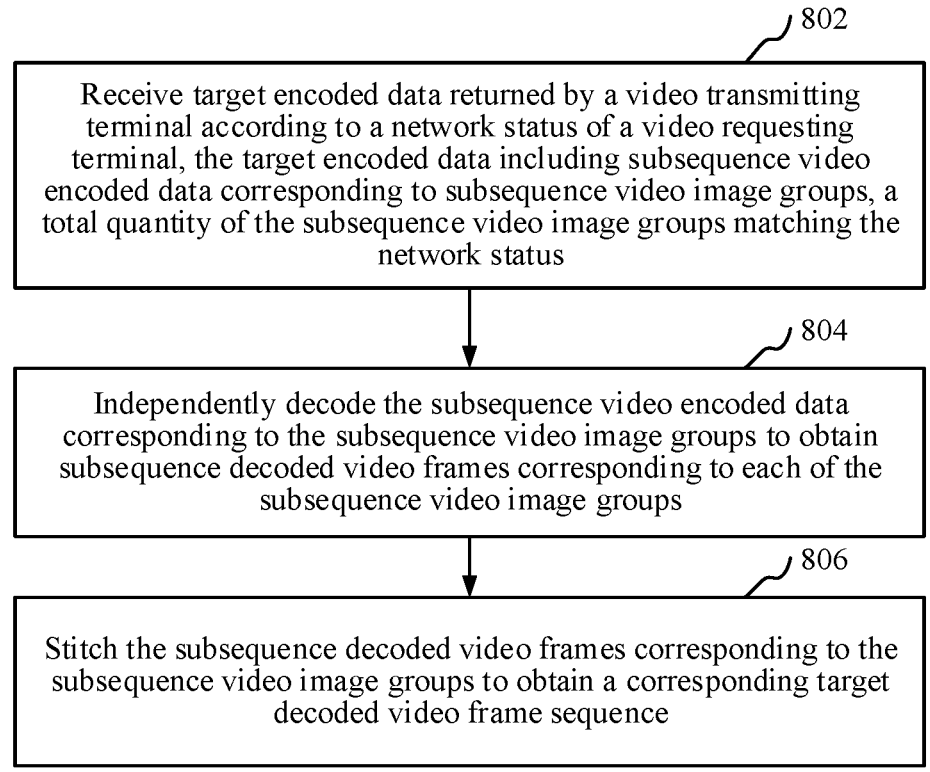
FIG. 8 is a schematic flowchart of a video decoding method according to an embodiment.

In an embodiment, as shown in FIG. 8, a video decoding method is provided. This embodiment is mainly described by using an example in which the method is applied to the terminal 110 or the server 120 in FIG. 1. Referring to FIG. 8, the video decoding method specifically includes the following steps:

Step 802. Receive target encoded data returned by a video transmitting terminal according to a network status of a video requesting terminal, the target encoded data including subsequence video encoded data corresponding to subsequence video image groups, a total quantity of the subsequence video image groups matching the network status.

The target encoded data is encoded data matching the network status of the video requesting terminal. The video transmitting terminal may store encoded data in advance. The encoded data may be independent encoded subsequence video image groups. Each of the encoded subsequence video image groups includes a plurality of pieces of subsequence video encoded data.

Specifically, the video requesting terminal determines the requested subsequence quantity according to the current network status thereof and transmits the video request to the video transmitting terminal. The video request carries the requested subsequence quantity. The video transmitting terminal may obtain the subsequence video encoded data corresponding to the subsequence video image groups according to the requested subsequence quantity, and return the subsequence video encoded data corresponding to the subsequence video image groups as the target encoded data to the video requesting terminal. When determining the requested subsequence quantity according to the current network status thereof, the video requesting terminal may follow the principle that a better current network status indicates a larger requested subsequence quantity and a worse current network status indicates a smaller requested subsequence quantity, which can ensure data transmission between the video transmitting terminal and the video requesting terminal, ensure smoothness of video playing in the video requesting terminal, and avoid problems of freezing or stopping during playing.

Step 804. Independently decode the subsequence video encoded data corresponding to the subsequence video image groups to obtain subsequence decoded video frames corresponding to each of the subsequence video image groups.

Because the subsequence video encoded data corresponding to the subsequence video image groups in the target encoded data is obtained through independent encoding, after the video requesting terminal receives the target encoded data returned by the video transmitting terminal, the subsequence video image groups in the target encoded data may be decoded fully independently and have no dependence on each other in a decoding order.

Specifically, after the video requesting terminal receives the target encoded data returned by the video transmitting terminal according to the network status of the video requesting terminal, the subsequence video encoded data corresponding to the subsequence video image groups in the target encoded data is independently decoded to obtain the subsequence decoded video frames corresponding to each of the subsequence video image groups.

Step 806. Stitch the subsequence decoded video frames corresponding to the subsequence video image groups to obtain a corresponding target decoded video frame sequence.

Specifically, after the subsequence video encoded data corresponding to the subsequence video image groups in the target encoded data is independently decoded to obtain the subsequence decoded video frames corresponding to each of the subsequence video image groups, the subsequence decoded video frames corresponding to the subsequence video image groups are stitched to obtain the corresponding target decoded video frame sequence. The stitching includes, but is not limited to, a temporal stitching manner and a spatial stitching manner. The temporal stitching manner is sorting the subsequence decoded video frames according to corresponding subsequence image identifiers to obtain the target decoded video frame sequence. The spatial stitching manner includes processing the subsequence decoded video frames according to a corresponding decoding resolution to obtain the corresponding intermediate subsequence decoded video frames, and upsampling the intermediate subsequence decoded video frames to obtain the target decoded video frame sequence.

In the foregoing video decoding method, the target encoded data returned by the video transmitting terminal according to the network status of the video requesting terminal is received, where the target encoded data includes the subsequence video encoded data corresponding to the subsequence video image groups, and the total quantity of the subsequence video image groups matches the network status; the subsequence video encoded data corresponding to the subsequence video image groups is independently decoded to obtain the subsequence decoded video frames corresponding to each of the subsequence video image groups; the subsequence decoded video frames corresponding to the subsequence video image groups are stitched to obtain the corresponding target decoded video frame sequence. Therefore, during video decoding, the matched target encoded data can be returned according to the network status of the video requesting terminal, to prevent the video requesting terminal from being affected by the network status and avoid quality problems of buffering, freezing, or stopping during playing, thereby ensuring the smoothness of video playing in the video requesting terminal. Moreover, the subsequence video image groups in the target encoded data can be decoded independently without interfering with each other, which can improve video decoding efficiency.

Figure 9:
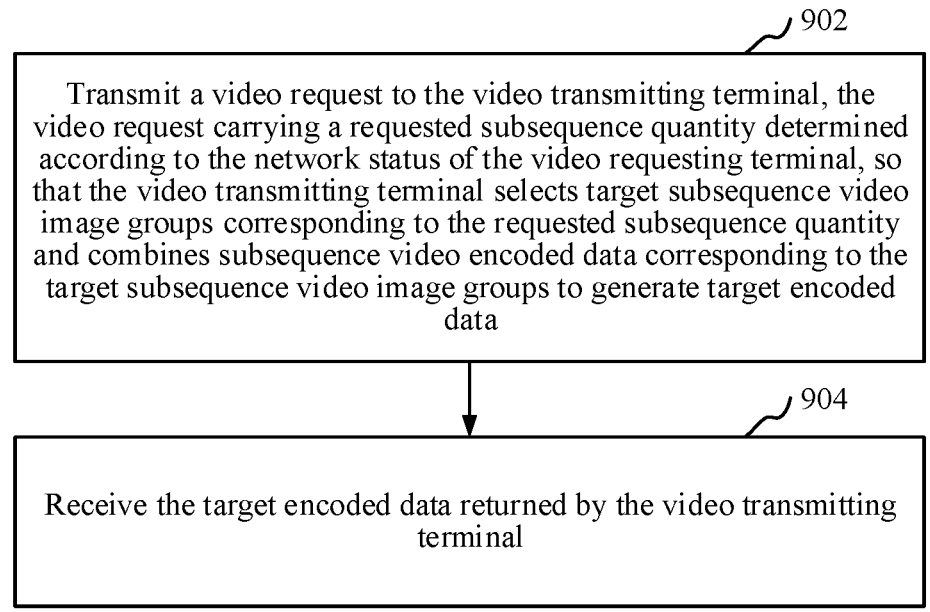
FIG. 9 is a schematic flowchart of receiving target encoded data returned by a video transmitting terminal according to a network status of a video requesting terminal of an embodiment.

In an embodiment, as shown in FIG. 9, receiving target encoded data returned by a video transmitting terminal according to a network status of a video requesting terminal includes the following steps:

Step 902. Transmit a video request to the video transmitting terminal, the video request carrying a requested subsequence quantity determined according to the network status of the video requesting terminal, so that the video transmitting terminal selects target subsequence video image groups corresponding to the requested subsequence quantity and combines subsequence video encoded data corresponding to the target subsequence video image groups to generate target encoded data.

Step 904. Receive the target encoded data returned by the video transmitting terminal.

Specifically, the video requesting terminal transmits the video request to the video transmitting terminal. The video request is used for requesting the target encoded data. The video request carries the requested subsequence quantity. The requested subsequence quantity carried in the video request is determined by the video requesting terminal according to the network status thereof. When determining the requested subsequence quantity according to the network status thereof, the video requesting terminal may follow the principle that a better network status indicates a larger requested subsequence quantity and a worse network status indicates a smaller requested subsequence quantity. The video requesting terminal may adjust the requested subsequence quantity according to the network status thereof. Further, after receiving the video request transmitted by the video requesting terminal, the video transmitting terminal directly selects the target subsequence video image groups corresponding to the requested subsequence quantity in the video request and combines the subsequence video encoded data corresponding to the target subsequence video image groups to generate the target encoded data. Finally, the video transmitting terminal returns the target encoded data to the video requesting terminal.

A selection method of selecting the target subsequence video image groups corresponding to the requested subsequence quantity by the video transmitting terminal may be customized. The customized selection method may be sequentially selecting the target subsequence video image groups corresponding to the requested subsequence quantity according to the group identifiers of the subsequence video image groups. Alternatively, the customized selection method may be randomly selecting the corresponding target subsequence video image groups from the stored subsequence video image groups according to the requested subsequence quantity.

Figure 10:
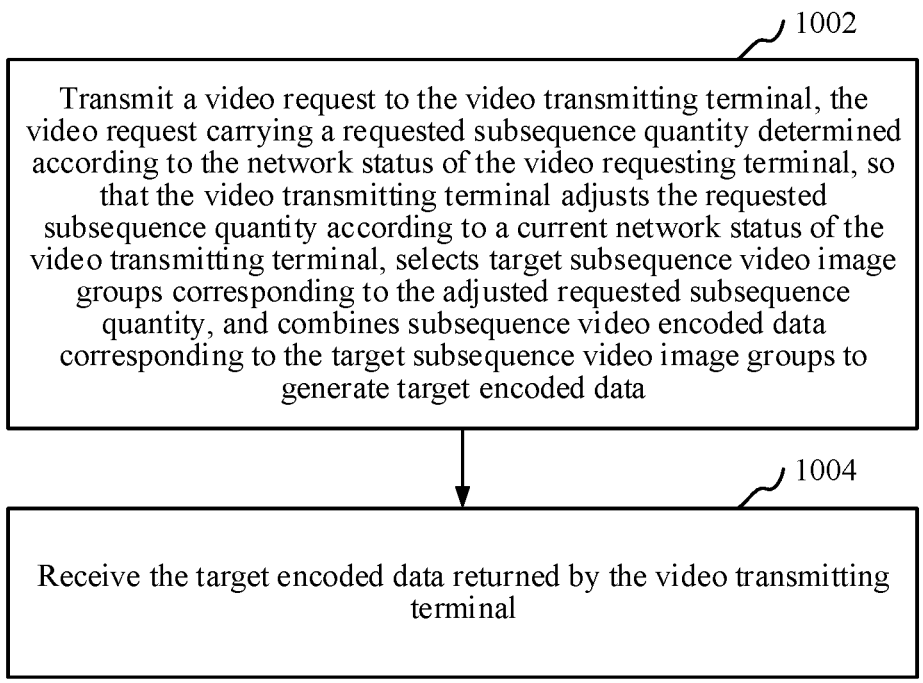
FIG. 10 is a schematic flowchart of receiving target encoded data returned by a video transmitting terminal according to a network status of a video requesting terminal of another embodiment.

In an embodiment, as shown in FIG. 10, the receiving target encoded data returned by a video transmitting terminal according to a network status of a video requesting terminal includes the following steps:

Step 1002. Transmit a video request to the video transmitting terminal, the video request carrying a requested subsequence quantity determined according to the network status of the video requesting terminal, so that the video transmitting terminal adjusts the requested subsequence quantity according to a current network status of the video transmitting terminal, selects target subsequence video image groups corresponding to the adjusted requested subsequence quantity, and combines subsequence video encoded data corresponding to the target subsequence video image groups to generate target encoded data.

Step 1004. Receive the target encoded data returned by the video transmitting terminal.

Specifically, the video requesting terminal transmits the video request to the video transmitting terminal. The video request is used for requesting the target encoded data. The video request carries the requested subsequence quantity. The requested subsequence quantity carried in the video request is determined by the video requesting terminal according to the network status thereof. When determining the requested subsequence quantity according to the network status thereof, the video requesting terminal may follow the principle that a better network status indicates a larger requested subsequence quantity and a worse network status indicates a smaller requested subsequence quantity. The video requesting terminal may adjust the requested subsequence quantity according to the network status thereof.

The network status of the video transmitting terminal also affects the transmission of the target encoded data between the video transmitting terminal and the video requesting terminal. Therefore, to avoid a data transmission failure between the video transmitting terminal and the video requesting terminal, current network status of the video transmitting terminal can be considered, and the requested subsequence quantity in the video request may be adjusted according to the current network status of the video transmitting terminal. Specifically, after receiving the video request transmitted by the video requesting terminal, the video transmitting terminal adjusts the requested subsequence quantity in the video request according to the current network status thereof, selects the target subsequence video image groups corresponding to the adjusted requested subsequence quantity, and combines the subsequence video encoded data corresponding to the target subsequence video image groups to generate the target encoded data. Finally, the video transmitting terminal returns the target encoded data to the video requesting terminal.

Figure 11:
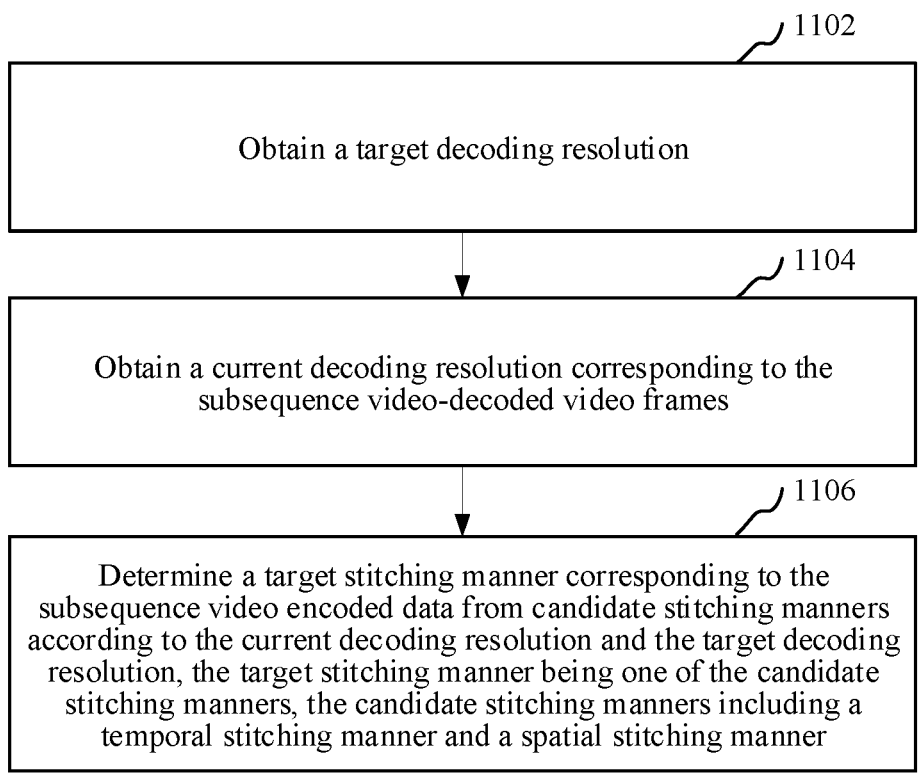
FIG. 11 is a schematic flowchart of a video decoding method according to another embodiment.

In an embodiment, as shown in FIG. 11, the video decoding method further includes the following steps:

Step 1102. Obtain a target decoding resolution.

Step 1104. Obtain a current decoding resolution corresponding to the subsequence decoded video frames.

The target decoding resolution refers to a decoding resolution corresponding to the target encoded data. The current decoding resolution refers to a decoding resolution corresponding to the subsequence decoded video frames. Specifically, after receiving the target encoded data returned by the video transmitting terminal, the video requesting terminal obtains the target decoding resolution in the target encoded data, and obtains the current decoding resolution corresponding to the subsequence decoded video frames in the target encoded data.

For example, the target decoding resolution of the target encoded data is 100*100, and the encoded data corresponding to the subsequence decoded video frames is obtained by processing based on the temporal sequence generation rule. In this case, the current decoding resolution of the subsequence decoded video frames is 100*100. If the encoded data corresponding to the subsequence decoded video frames is obtained by processing based on the spatial sequence generation rule, then the current decoding resolution of the subsequence decoded video frames is 50*50. That is, the target decoding resolution may be the same as the current decoding resolution corresponding to the subsequence decoded video frames, or may be different from the current decoding resolution corresponding to the subsequence decoded video frames, which may be specifically determined according to the sequence generation rule corresponding to the encoded data corresponding to the subsequence decoded video frames.

Step 1106. Determine a target stitching manner corresponding to the subsequence video encoded data from candidate stitching manners according to the current decoding resolution and the target decoding resolution, the target stitching manner being one of the candidate stitching manners, the candidate stitching manners including a temporal stitching manner and a spatial stitching manner.

Specifically, after the target decoding resolution and the current decoding resolution corresponding to the subsequence decoded video frames are obtained, the target stitching manner corresponding to the subsequence video encoded data may be determined from the candidate stitching manners according to the current decoding resolution and the target decoding resolution. The target stitching manner is one of the candidate stitching manners, and the candidate stitching manners include a temporal stitching manner and a spatial stitching manner.

Determining a target stitching manner corresponding to the subsequence video encoded data from candidate stitching manners according to the current decoding resolution and the target decoding resolution may be specifically as follows: determining the temporal stitching manner from the candidate stitching manners as the target stitching manner corresponding to the subsequence video encoded data when the current decoding resolution and the target decoding resolution are the same, and determining the spatial stitching manner from the candidate stitching manners as the target stitching manner corresponding to the subsequence video encoded data when the current decoding resolution is lower than the target decoding resolution.

Figure 12:
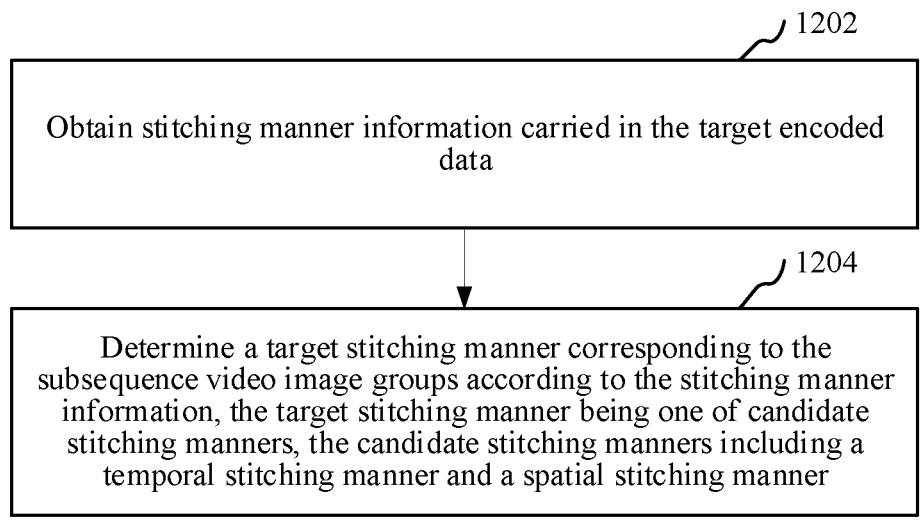
FIG. 12 is a schematic flowchart of a video decoding method according to still another embodiment.

In an embodiment, as shown in FIG. 12, the video decoding method further includes the following steps:

Step 1202. Obtain stitching manner information carried in the target encoded data.

Step 1204. Determine a target stitching manner corresponding to the subsequence video image groups according to the stitching manner information, the target stitching manner being one of candidate stitching manners, the candidate stitching manners including a temporal stitching manner and a spatial stitching manner.

During encoding, the stitching manner information is carried in the target encoded data, so that the stitching manner information carried in the target encoded data may be directly obtained. The stitching manner information is information related to the stitching manner of the subsequence video image groups. The target stitching manner corresponding to the subsequence video image groups may be determined according to the stitching manner information. Specifically, the stitching manner information carried in the target encoded data is obtained, and the target stitching manner corresponding to the subsequence video image groups is directly determined from candidate stitching manners according to the obtained stitching manner information, where the target stitching manner is one of the candidate stitching manners, and the candidate stitching manners include a temporal stitching manner and a spatial stitching manner.

For example, when the stitching manner information carried in the target encoded data is information related to the temporal stitching manner, it may be directly determined that the target stitching manner corresponding to the subsequence video image groups is the temporal stitching manner. Similarly, when the stitching manner information carried in the target encoded data is information related to the spatial stitching manner, it may be directly determined that the target stitching manner corresponding to the subsequence video image groups is the spatial stitching manner.

Figure 13:
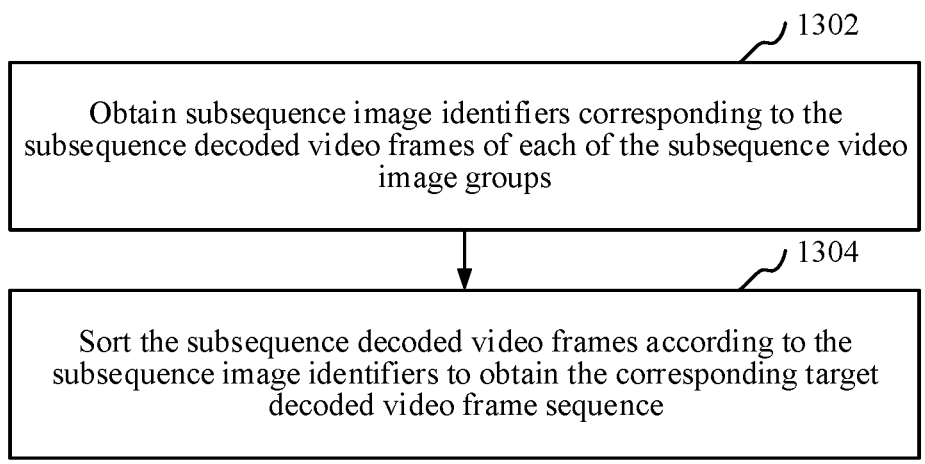
FIG. 13 is a schematic flowchart of a step of stitching in a temporal stitching manner according to an embodiment.

In an embodiment, as shown in FIG. 13, the target stitching manner is the temporal stitching manner, and the stitching the subsequence decoded video frames corresponding to the subsequence video image groups to obtain a corresponding target decoded video frame sequence includes the following steps:

Step 1302. Obtain subsequence image identifiers corresponding to the subsequence decoded video frames of each of the subsequence video image groups.

Step 1304. Sort the subsequence decoded video frames according to the subsequence image identifiers to obtain the corresponding target decoded video frame sequence.

When it is determined that the target stitching manner corresponding to the subsequence video image groups is the temporal stitching manner, it indicates that the subsequence video image groups are processed by using the temporal generation rule during encoding to obtain independent subsequence video image groups. Specifically, the subsequence image identifiers corresponding to the subsequence decoded video frames of the subsequence video image groups are obtained. The subsequence image identifier is used for uniquely identifying the subsequence decoded video frame. The corresponding subsequence image identifiers are already assigned to the subsequence decoded video frames in the subsequence video image group during encoding, so that the subsequence image identifiers corresponding to the subsequence decoded video frames of each of the subsequence video image groups may be directly obtained. Further, the subsequence decoded video frames are sorted according to the subsequence image identifiers to obtain the corresponding target decoded video frame sequence. A sorting method may be customized, including sorting the subsequence image identifiers in ascending order to obtain the corresponding target decoded video frame sequence.

For example, when the temporal stitching manner is determined as the target stitching manner corresponding to the subsequence video image groups, the subsequence decoded video frames of the subsequence video image groups in the target encoded data are as follows: the subsequence video image group 0 includes subsequence decoded video frame 0, subsequence decoded video frame 3, subsequence decoded video frame 6, subsequence decoded video frame 9, subsequence decoded video frame 12, and subsequence decoded video frame 15; the subsequence video image group 1 includes subsequence decoded video frame 1, subsequence decoded video frame 4, subsequence decoded video frame 7, subsequence decoded video frame 10, subsequence decoded video frame 13, and subsequence decoded video frame 16. Then, when the temporal stitching manner is determined as the target stitching manner corresponding to the subsequence video image groups, the subsequence decoded video frames are sorted according to the subsequence image identifiers to obtain the corresponding target decoded video frame sequence. The target decoded video frame sequence is as follows: the subsequence decoded video frame 0, the subsequence decoded video frame 1, the subsequence decoded video frame 3, the subsequence decoded video frame 4, the subsequence decoded video frame 6, the subsequence decoded video frame 7, the subsequence decoded video frame 9, the subsequence decoded video frame 10, the subsequence decoded video frame 12, the subsequence decoded video frame 13, the subsequence decoded video frame 15, and the subsequence decoded video frame 16.

In the temporal stitching manner, when the current network status of the video requesting terminal is good, the video requesting terminal requests more or even all subsequence video image groups. Therefore, the video requesting terminal can output, through decoding, more or even all subsequence decoded video frames in the original video data, for sorting or frame interpolation. Users will experience a higher video frame rate, and the viewing experience is better. Conversely, when the current network status of the video requesting terminal becomes worse, the video transmitting terminal reduces the requested subsequence quantity, or even only retains one subsequence video image group. Therefore, the video requesting terminal can output, through decoding, fewer subsequence decoded video frames. After frames are discarded, as the requested subsequence quantity is reduced, worse viewing experience of buffering, freezing, or stopping during playing under the poor network status can be avoided.

Figure 14:
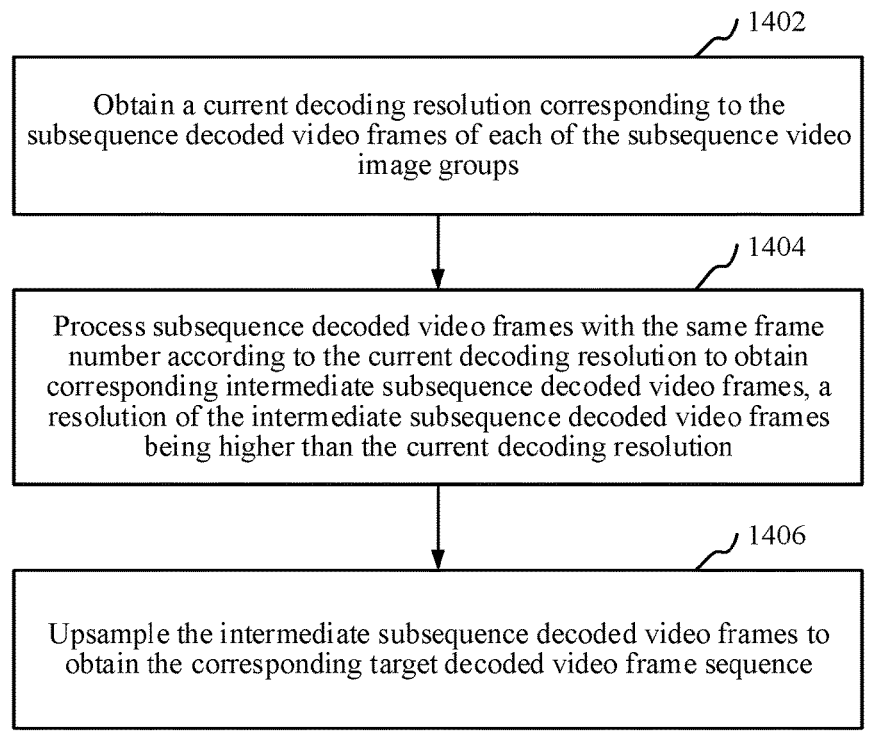
FIG. 14 is a schematic flowchart of a step of stitching in a spatial stitching manner according to an embodiment.

In an embodiment, as shown in FIG. 14, the target stitching manner is the spatial stitching manner, and the stitching the subsequence decoded video frames corresponding to the subsequence video image groups to obtain a corresponding target decoded video frame sequence includes the following steps:

Step 1402. Obtain a current decoding resolution corresponding to the subsequence decoded video frames of each of the subsequence video image groups.

Step 1404. Process subsequence decoded video frames with the same frame number according to the current decoding resolution to obtain corresponding intermediate subsequence decoded video frames, a resolution of the intermediate subsequence decoded video frames being higher than the current decoding resolution.

When the spatial stitching manner is determined as the target stitching manner corresponding to the subsequence video image groups, it indicates that the subsequence video image groups are processed by using the spatial generation rule during encoding to obtain independent subsequence video image groups. Specifically, the current decoding resolution corresponding to the subsequence decoded video frames of each of the subsequence video image groups is obtained, and the subsequence decoded video frames with the same frame number are processed according to the current decoding resolution to obtain the corresponding intermediate subsequence decoded video frames, the resolution of the intermediate subsequence decoded video frames being higher than the current decoding resolution. The same frame number means that the encoded data corresponding to the subsequence decoded video frames is subsequence decoded video frames belonging to the same frame. For example, as shown in FIG. 7A, assuming that the subsequence video image groups in FIG. 7A are the subsequence video image groups during the decoding process, the first NO. 0 subsequence decoded video frame in the subsequence video image group 0, the first NO. 1 subsequence decoded video frame in the subsequence video image group 1, the first NO. 2 subsequence decoded video frame in the subsequence video image group 2, and the first NO. 3 subsequence decoded video frame in the subsequence video image group 3 are the subsequence decoded video frames with the same frame number.

The step of processing subsequence decoded video frames with the same frame number according to the current decoding resolution to obtain corresponding intermediate subsequence decoded video frames may include the steps of calculating the current decoding resolution of the subsequence decoded video frames with the same frame number to obtain a new decoding resolution, and using the subsequence decoded video frames corresponding to the new decoding resolution as the corresponding intermediate subsequence decoded video frames.

Step 1406. Upsample the intermediate subsequence decoded video frames to obtain the corresponding target decoded video frame sequence.

Upsampling means upsampling the intermediate subsequence decoded video frames to obtain images with a relatively high resolution in the target decoded video frame sequence. Specifically, after the intermediate subsequence decoded video frames are obtained, the intermediate subsequence decoded video frames are upsampled to obtain the corresponding target decoded video frame sequence. The upsampling method may be an upsampling method in the related technology, and the detailed steps of the upsampling method are not described herein.

In the spatial stitching manner, when the current network status of the video requesting terminal is good, the target encoded data includes more or even all subsequence video image groups. Therefore, the video requesting terminal can obtain, through decoding, more or even all low-resolution subsequence decoded video frames in the subsequence video image groups, and a plurality of images with the low resolution may be upsampled to obtain images with a high resolution. Users experience a higher video image resolution, and the viewing experience is better. Conversely, when the network status of the video requesting terminal becomes worse, the video transmitting terminal reduces the requested subsequence quantity, or even only retains one subsequence video image group. Therefore, the video requesting terminal can output, after the decoding process, fewer subsequence decoded video frames with a low resolution, and the resolution obtained after upsampling becomes lower, or even only one group of images with the lowest resolution is obtained. However, due to a smaller requested subsequence quantity, worse viewing experience of buffering, freezing, or stopping during playing under the poor network status can be avoided.

In a specific embodiment, a video encoding method and a video decoding method are provided. In this embodiment, an example in which the methods are applied to the terminal 110 or the server 120 in FIG. 1 is mainly used for description. The methods specifically include the following steps:

1. Obtain video data, the video data including a plurality of original video images.

2. Process the video data according to a sequence generation rule to obtain a plurality of independent subsequence video image groups, each of the subsequence video image groups including subsequence images corresponding to the sequence generation rule.

2-1. The sequence generation rule includes a temporal generation rule, and the subsequence images are images extracted from the original video images according to an extraction interval.

2-1-1. Obtain a total quantity of the subsequence video image groups.

2-1-2. Obtain a group identifier corresponding to each of the subsequence video image groups.

2-1-3. Determine target subsequence image identifiers corresponding to each of the subsequence video image groups according to the total quantity of the subsequence video image groups and the group identifier.

2-1-4. Extract the subsequence images corresponding to each of the subsequence video image groups from the original video images according to the target subsequence image identifiers corresponding to each of the subsequence video image groups and frame identifiers corresponding to the original video images.

2-2. The sequence generation rule includes a spatial generation rule, and the subsequence images are images obtained by downsampling the original video images.

2-2-1. Downsample each of the original video images to obtain a video subframe set corresponding to each of the original video images, the video subframe set including a plurality of video subframes with the same resolution.

2-2-2. Determine video subframe numbers corresponding to the video subframes in each of the video subframe sets according to the same rule.

2-2-3. Sequentially obtain, according to an order of the original video images, video subframes with the same video subframe number corresponding to the original video images, to group into the same subsequence video image group.

3. Obtain encoding manners corresponding to the subsequence video image groups.

4. Independently encode the corresponding subsequence video image groups according to the encoding manners to obtain subsequence video encoded data corresponding to each of the subsequence video image groups.

5. Obtain a target subsequence quantity.

5-1. Receive a video request transmitted by a video requesting terminal, the video request carrying a requested subsequence quantity determined according to a current network status of the video requesting terminal, and use the requested subsequence quantity as the target subsequence quantity.

5-2. Adjust the requested subsequence quantity according to a current network status of a video transmitting terminal, and use the adjusted requested subsequence quantity as the target subsequence quantity.

6. Select target subsequence video image groups corresponding to the target subsequence quantity.

7. Combine subsequence video encoded data corresponding to the target subsequence video image groups to generate target encoded data.

8. Receive the target encoded data returned by the video transmitting terminal according to the network status of the video requesting terminal, the target encoded data including subsequence video encoded data corresponding to subsequence video image groups, a total quantity of the subsequence video image groups matching the network status.

8-1. Transmit a video request to the video transmitting terminal, the video request carrying a requested subsequence quantity determined according to the network status of the video requesting terminal, so that the video transmitting terminal selects target subsequence video image groups corresponding to the requested subsequence quantity and combines subsequence video encoded data corresponding to the target subsequence video image groups to generate target encoded data; and receive the target encoded data returned by the video transmitting terminal.

8-2. Transmit a video request to the video transmitting terminal, the video request carrying a requested subsequence quantity determined according to the network status of the video requesting terminal, so that the video transmitting terminal adjusts the requested subsequence quantity according to the current network status of the video transmitting terminal, selects target subsequence video image groups corresponding to the adjusted requested subsequence quantity, and combines subsequence video encoded data corresponding to the target subsequence video image groups to generate target encoded data; and receive the target encoded data returned by the video transmitting terminal.

9. Independently decode the subsequence video encoded data corresponding to the subsequence video image groups to obtain subsequence decoded video frames corresponding to each of the subsequence video image groups.

10. Determine a target stitching manner corresponding to the subsequence video encoded data.

10-1. Obtain a target decoding resolution, obtain a current decoding resolution corresponding to the subsequence decoded video frames, and determine a target stitching manner corresponding to the subsequence video encoded data from candidate stitching manners according to the current decoding resolution and the target decoding resolution, the target stitching manner being one of the candidate stitching manners, the candidate stitching manners including a temporal stitching manner and a spatial stitching manner.

10-2. Obtain stitching manner information carried in the target encoded data, and determine a target stitching manner corresponding to the subsequence video image groups according to the stitching manner information, the target stitching manner being one of candidate stitching manners, the candidate stitching manners including a temporal stitching manner and a spatial stitching manner.

11. Stitch the subsequence decoded video frames corresponding to the subsequence video image groups according to the target stitching manner to obtain a corresponding target decoded video frame sequence.

11-1. When the target stitching manner is the temporal stitching manner, obtain subsequence image identifiers corresponding to the subsequence decoded video frames of each of the subsequence video image groups, and sort the subsequence decoded video frames according to the subsequence image identifiers to obtain the corresponding target decoded video frame sequence.

11-2. When the target stitching manner is the spatial stitching manner, obtain a current decoding resolution corresponding to the subsequence decoded video frames of each of the subsequence video image groups, process subsequence decoded video frames with the same frame number according to the current decoding resolution to obtain corresponding intermediate subsequence decoded video frames, a resolution of the intermediate subsequence decoded video frames being higher than the current decoding resolution, and upsample the intermediate subsequence decoded video frames to obtain the corresponding target decoded video frame sequence.

Figure 15:
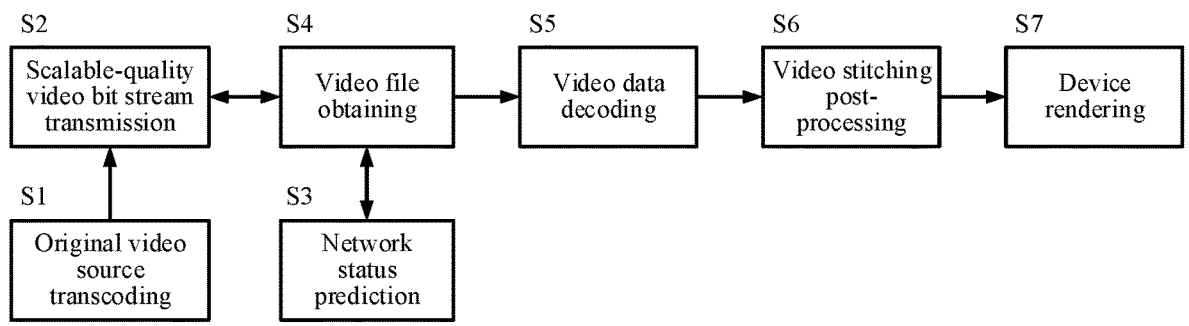
FIG. 15 is a schematic diagram of a principle of video encoding and decoding according to an embodiment.

In an application scenario of video encoding and decoding, FIG. 15 is a schematic diagram of a principle of video encoding and decoding according to an embodiment. As shown in FIG. 15, steps in FIG. 15 are described in detail below:

S1. An "original video source transcoding" module is responsible for transcoding an original video source into a plurality of bit streams required for streaming media services, which may be specifically divided into a plurality of sub-steps: dividing an original video source image sequence into a plurality of subsequence video image groups, and encoding each of the subsequence video image groups by a corresponding subsequence video image group encoding module. The quantity of the subsequence video image groups is determined by specific implementation services. The principle is that if the streaming media service requires a relatively large quantity of delicate scalable quality grades to adapt to changes of the network status, the quantity of the groups may be larger, and conversely, the quantity of the groups may be smaller.

(1) A first dividing method is to arrange the original video images in the video data according to a time axis for extraction and divide the original video images into the corresponding subsequence video image groups. Assuming that the streaming media service requires a scalable quality grade M (M is a total quantity of the subsequence video image groups) to be provided, the subsequence video image group N is composed of the original video images with a number $\partial *M+N$ in the video data, where $\partial$ is a natural number, N<M, and M and N are positive integers. The method for obtaining the subsequences through extraction according to the time axis can provide temporal scalability of images, that is, an actual decoded image frame rate is used to adapt to changes of the network status. Specifically, a higher network throughput/bandwidth indicates a higher video frame rate, and conversely, a frame rate may be gradually decreased to save the data that needs to be transmitted. For details, refer to FIG. 6A.

(2) In a second division method, the original video images in the video data are downsampled to obtain a plurality of low-resolution subsequence images. The low-resolution subsequence images are grouped into corresponding subsequence video image groups. Similarly, a depth of downsampling may be specifically determined according to the delicateness of the scalable quality grades provided by the service. Correspondingly, on a decoding and playing terminal, the quantity of subsequences to be requested may be selected according to an actual status of the network. When the actual bandwidth of the network increases, the obtained subsequences increase. As the obtained low-resolution images increase, high-resolution images with higher quality can be restored. Conversely, the effect of reducing data transmission to adapt to low bandwidth can be achieved by only requesting subsequences, thereby achieving spatial scalability. An image downsampling algorithm is a public mature technology, and the implementation thereof does not affect the implementation effect of this application. Details are not described herein again. For details, refer to FIG. 7A.

Further, an existing mature video encoding standard is used for encoding the subsequence video image groups. To be fully compatible with existing decoding devices and systems on the market, this application only uses algorithm tools within a benchmark range of the public video encoding standard in this environment. In addition, because the encoding of each subsequence is completely separate, the outputted bit streams of the subsequence video image groups can be decoded fully independently and have no dependence on each other (in a decoding order). Moreover, because image contents of the subsequence video image groups are non-overlapping, complete encoding is performed on the original video images in the video data only once in this application, and there is no redundancy in encoding operations and storage.

S2. Subsequence video encoded data corresponding to each of the subsequence video image groups outputted in S1 is transmitted.

S3. The quality of the network status in a future period of time may be determined and predicted through information in the past such as an actual download speed, a timeout rate, and an error rate. A specific prediction algorithm is implemented according to application. For example, an average download speed in a past period of time may be used as a predicted value of a subsequent download speed. The time period for determining can also be flexibly set. For example, the determining may be performed every 5 seconds or after each slice file in the HLS/DASH protocol is downloaded.

S4. When the video quality needs to be improved according to the output of S3, first, the currently requested subsequence bit streams are kept unchanged, and then additional subsequence bit streams are requested; and conversely, when the video quality needs to be reduced according to the output of S3, a plurality of requested subsequence bit streams may be disconnected according to a certain rule. According to the output of S3, the quantity of subsequence bit streams requested or disconnected may be flexibly determined depending on a specific service, and the execution policy thereof does not affect the implementation of the overall solution of this application.

S5. The subsequence video image groups divided by the S1 module are independently encoded, so that the subsequence video image groups on the decoding terminal may be independently decoded and have no order dependence on each other. In addition, because the solution of this application only needs to use algorithm tools within a benchmark range of the existing public video encoding standard, the solution of this application can be supported by mainstream devices on the market.

S6. The subsequence video image groups outputted by S5 are enhanced by an inverse operation of the division algorithm of the subsequence video image groups in the S1 module, to obtain higher or lower image quality, so as to realize the scalability of video quality.

For example, suppose that: (1) The streaming media service provides temporal scalability; in this case, when the network status is good, the S4 module requests more or even all subsequence video image groups. Therefore, S5 can output, through decoding, more or even all image frames on a timeline of an original image sequence, for sorting and frame interpolation. Users experience a higher video frame rate, and the viewing experience is better. Conversely, when the network status becomes worse, the S4 module reduces the requested subsequence bit streams, or even only retains one subsequence bit stream. Therefore, S5 can output, through decoding, fewer image frames. After frames are discarded, as less video data is requested, worse viewing experience of buffering, freezing, or stopping during playing under the poor network status can be avoided.

(2) The streaming media service provides spatial scalability; in this case, when the network status is good, the S4 module requests more or even all subsequence bit streams. Therefore, S5 can output, through decoding, more or even all low-resolution subsequence image frames, and a plurality of low-resolution images may be upsampled to obtain images with a high resolution. Users experience a higher video image resolution, and the viewing experience is better. Conversely, when the network status becomes worse, the S4 module reduces the requested subsequence bit streams, or even only retains one subsequence bit stream. Therefore, S5 can output, through decoding, fewer low-resolution image frames, and the resolution obtained after the upsampling becomes lower, or even only one stream of images with the lowest resolution is obtained. As less video data is requested, worse viewing experience of buffering, freezing, or stopping during playing under the poor network status can be avoided.

S7. A target decoded video frame sequence outputted by S6 is displayed by a peripheral device.

It is to be understood that steps in the foregoing flowchart are displayed in sequence based on indication of arrows, but the steps are not necessarily performed in sequence based on a sequence indicated by the arrows. Unless clearly specified in this specification, there is no strict sequence limitation on the execution of the steps, and the steps may be performed in another sequence. Besides, at least some steps in the foregoing flowchart may include a plurality of sub-steps or a plurality of stages, the sub-steps or stages are not necessarily performed at a same moment and may be performed at different moments, the sub-steps or stages are not necessarily sequentially performed, and the sub-steps or stages and at least some of other steps or sub-steps or stages of other steps may be performed in turn or alternately.

Figure 16:
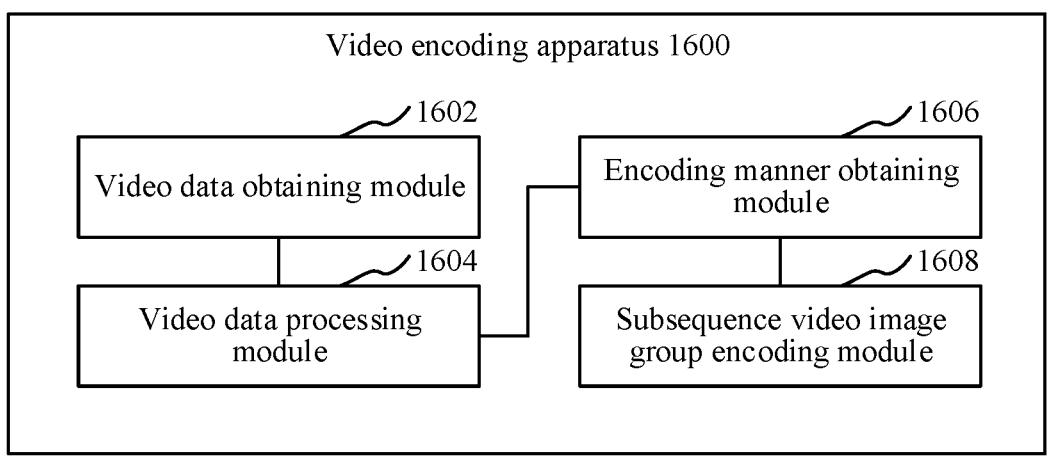
FIG. 16 is a structural block diagram of an encoding apparatus according to an embodiment.

In an embodiment, as shown in FIG. 16, a video encoding apparatus 1600 is provided, including:
- a video data obtaining module 1602, configured to obtain video data, the video data including a plurality of original video images;
- a video data processing module 1604, configured to process the video data according to a sequence generation rule to obtain a plurality of independent subsequence video image groups, each of the subsequence video image groups including subsequence images corresponding to the sequence generation rule;
- an encoding manner obtaining module 1606, configured to obtain encoding manners corresponding to the subsequence video image groups; and
- a subsequence video image group encoding module 1608, configured to independently encode the corresponding subsequence video image groups according to the encoding manners to obtain subsequence video encoded data corresponding to each of the subsequence video image groups.

In the foregoing video encoding apparatus, video data is processed by the video data processing module according to a sequence generation rule to obtain a plurality of independent subsequence video image groups, and each of the subsequence video image groups includes subsequence images corresponding to the sequence generation rule. During encoding by the subsequence video image group encoding module, each of the independent subsequence video image groups is independently encoded according to the corresponding encoding manner, and the subsequence video image groups do not interfere with each other and have no dependence on each other during the encoding. The video data is processed according to the sequence generation rule to obtain the plurality of independent subsequence video image groups, and contents of the subsequence images in the subsequence video image groups are non-overlapping. Therefore, complete encoding needs to be performed on the video data only once, and there is no redundancy in encoding operations and storage. Further, an amount of subsequence video encoded data can be adaptively adjusted according to a network status, thereby avoiding quality problems of buffering, freezing, or stopping during playing by a decoder caused by changes in the network status, and improving the smoothness of video playing.

Figure 17:
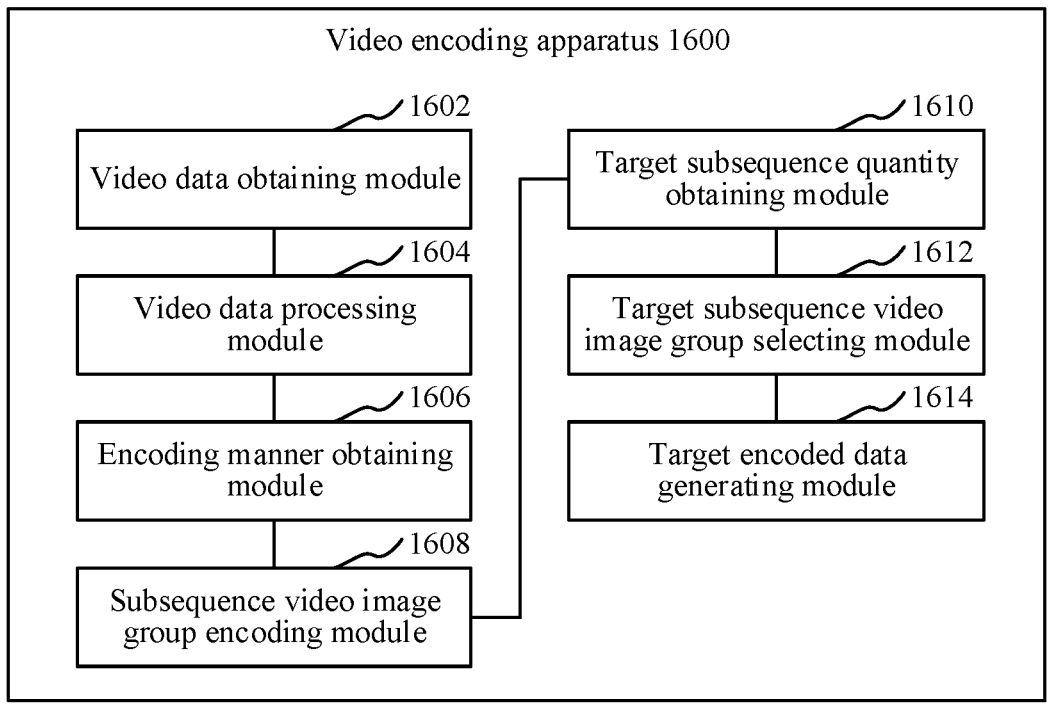
FIG. 17 is a structural block diagram of an encoding apparatus according to another embodiment.

In an embodiment, as shown in FIG. 17, the video encoding apparatus 1600 further includes:
- a target subsequence quantity obtaining module 1610, configured to obtain a target subsequence quantity;
- a target subsequence video image group selecting module 1612, configured to select target subsequence video image groups corresponding to the target subsequence quantity; and
- a target encoded data generating module 1614, configured to combine subsequence video encoded data corresponding to the target subsequence video image groups to generate target encoded data.

In an embodiment, the target subsequence quantity obtaining module 1610 is further configured to receive a video request transmitted by a video requesting terminal, the video request carrying a requested subsequence quantity determined according to a current network status of the video requesting terminal, and use the requested subsequence quantity as the target subsequence quantity.

In an embodiment, the target subsequence quantity obtaining module 1610 is further configured to adjust the requested subsequence quantity according to a current network status of a video transmitting terminal, and use the adjusted requested subsequence quantity as the target subsequence quantity.

In an embodiment, the sequence generation rule includes a temporal generation rule, and the subsequence images are images extracted from the original video images according to an extraction interval.

Figure 18:
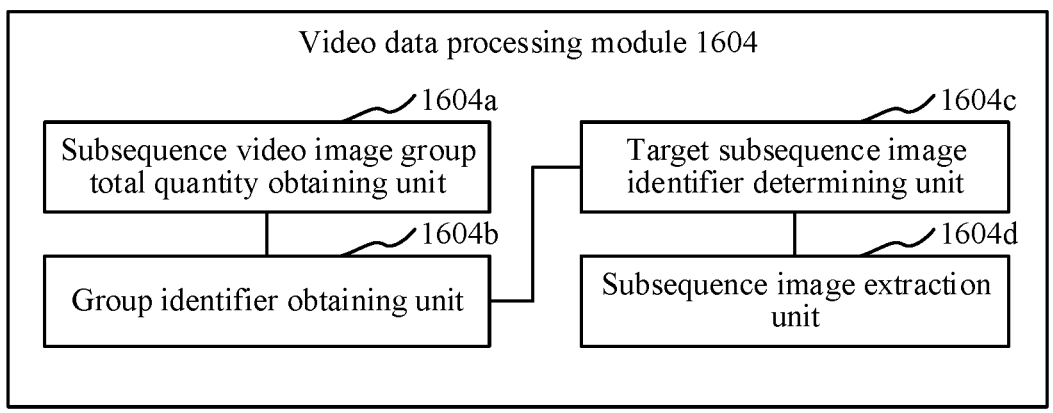
FIG. 18 is a structural block diagram of a video data processing module according to an embodiment.

In an embodiment, as shown in FIG. 18, the video data processing module 1604 includes:
- a subsequence video image group total quantity obtaining unit 1604*a*, configured to obtain a total quantity of the subsequence video image groups;
- a group identifier obtaining unit 1604*b*, configured to obtain a group identifier corresponding to each of the subsequence video image groups;
- a target subsequence image identifier determining unit 1604*c*, configured to determine target subsequence image identifiers corresponding to each of the subsequence video image groups according to the total quantity of the subsequence video image groups and the group identifier; and
- a subsequence image extraction unit 1604*d*, configured to extract the subsequence images corresponding to each of the subsequence video image groups from the original video images according to the target subsequence image identifiers corresponding to each of the subsequence video image groups and frame identifiers corresponding to the original video images.

In an embodiment, the sequence generation rule includes a spatial generation rule, and the subsequence images are images obtained by downsampling the original video images.

Figure 19:
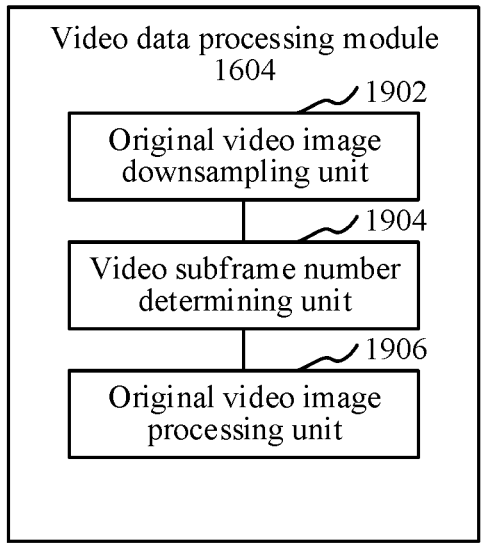
FIG. 19 is a structural block diagram of a video data processing module according to another embodiment.

In an embodiment, as shown in FIG. 19, the video data processing module 1604 includes:
- an original video image downsampling unit 1902, configured to downsample each of the original video images to obtain a video subframe set corresponding to each of the original video images, the video subframe set including a plurality of video subframes with the same resolution;
- a video subframe number determining unit 1904, configured to determine video subframe numbers corresponding to the video subframes in each of the video subframe sets according to the same rule; and
- an original video image processing unit 1906, configured to sequentially obtain video subframes with the same video subframe number corresponding to the original video images, according to an order of the original video images, to group into the same subsequence video image group.

Figure 20:
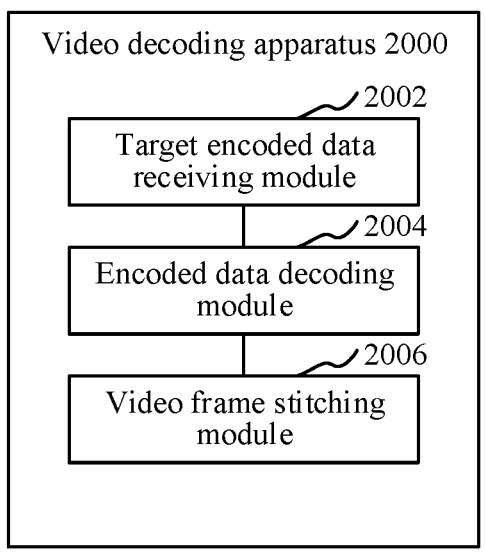
FIG. 20 is a structural block diagram of a video decoding apparatus according to an embodiment.

In an embodiment, as shown in FIG. 20, a video decoding apparatus 2000 is provided, including:
- a target encoded data receiving module 2002, configured to receive target encoded data returned by a video transmitting terminal according to a network status of a video requesting terminal, the target encoded data including subsequence video encoded data corresponding to a subsequence video image group, and a total quantity of the subsequence video image groups matching the network status;
- an encoded data decoding module 2004, configured to independently decode the subsequence video encoded data corresponding to the subsequence video image groups to obtain subsequence decoded video frames corresponding to each of the subsequence video image groups; and
- a video frame stitching module 2006, configured to stitch the subsequence decoded video frames corresponding to the subsequence video image groups to obtain a corresponding target decoded video frame sequence.

In an embodiment, the target encoded data receiving module 2002 is further configured to transmit a video request to the video transmitting terminal, the video request carrying a requested subsequence quantity determined according to the network status of the video requesting terminal, so that the video transmitting terminal selects target subsequence video image groups corresponding to the requested subsequence quantity, combine subsequence video encoded data corresponding to the target subsequence video image groups to generate target encoded data, and receive the target encoded data returned by the video transmitting terminal.

In an embodiment, the target encoded data receiving module 2002 is further configured to transmit a video request to the video transmitting terminal, the video request carrying a requested subsequence quantity determined according to the network status of the video requesting terminal, so that the video transmitting terminal adjusts the requested subsequence quantity according to a current network status of the video transmitting terminal and selects target subsequence video image groups corresponding to the adjusted requested subsequence quantity, combine subsequence video encoded data corresponding to the target subsequence video image groups to generate target encoded data, and receive the target encoded data returned by the video transmitting terminal.

Figure 21:
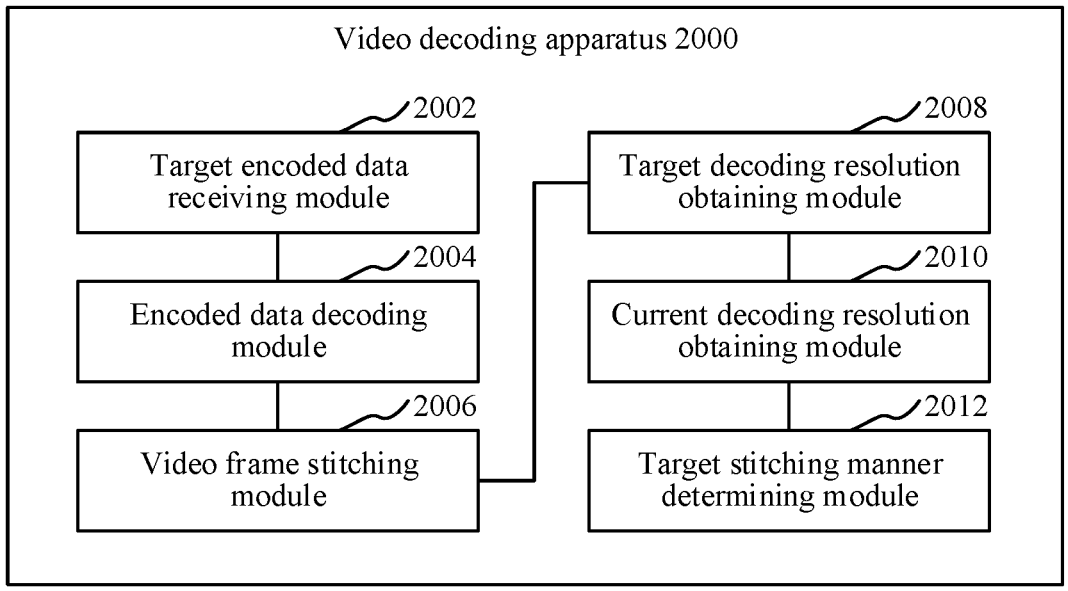
FIG. 21 is a structural block diagram of a video decoding apparatus according to another embodiment.

In an embodiment, as shown in FIG. 21, the video decoding apparatus 2000 further includes:
- a target decoding resolution obtaining module 2008, configured to obtain a target decoding resolution;
- a current decoding resolution obtaining module 2010, configured to obtain a current decoding resolution corresponding to each of the subsequence decoded video frames; and
- a target stitching manner determining module 2012, configured to determine a target stitching manner corresponding to the subsequence video encoded data from candidate stitching manners according to the current decoding resolution and the target decoding resolution, the target stitching manner being one of the candidate stitching manners, the candidate stitching manners including a temporal stitching manner and a spatial stitching manner.

Figure 22:
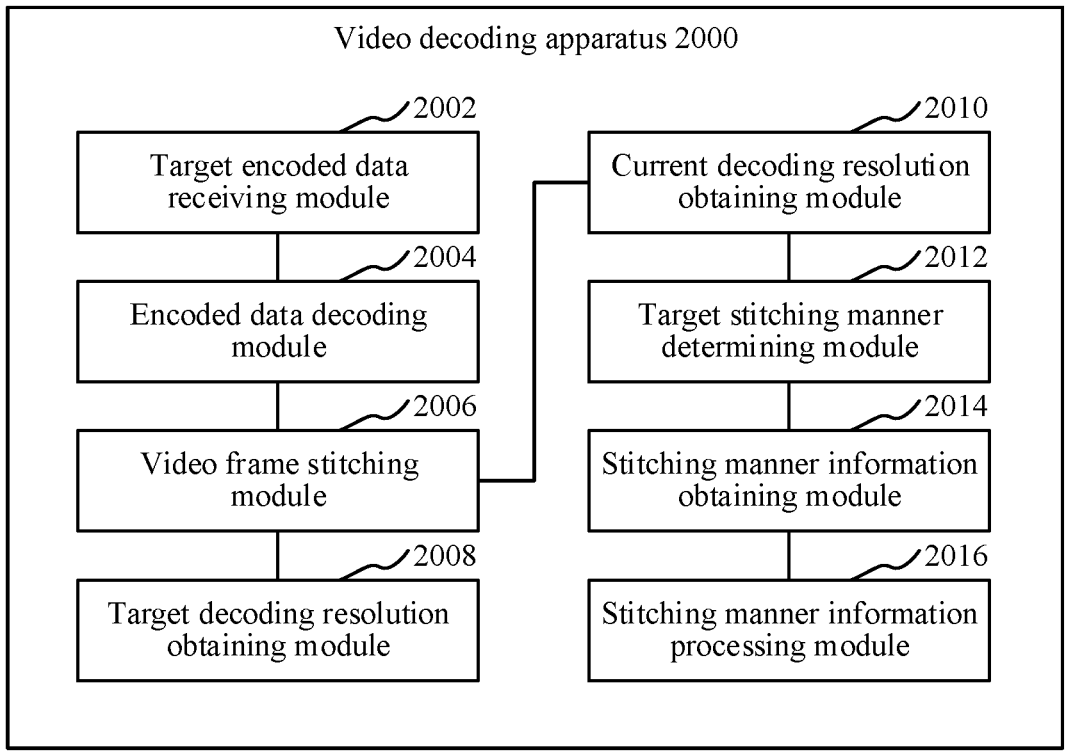
FIG. 22 is a structural block diagram of a video decoding apparatus according to still another embodiment.

In an embodiment, as shown in FIG. 22, the video decoding apparatus 2000 further includes:
- a stitching manner information obtaining module 2014, configured to obtain stitching manner information carried in the target encoded data; and
- a stitching manner information processing module 2016, configured to determine a target stitching manner corresponding to the subsequence video image groups according to the stitching manner information, the target stitching manner being one of candidate stitching manners, the candidate stitching manners including a temporal stitching manner and a spatial stitching manner.

In an embodiment, When the target stitching manner is the temporal stitching manner, the video frame stitching module 2006 is further configured to obtain subsequence image identifiers corresponding to the subsequence decoded video frames of each of the subsequence video image groups, and sort the subsequence decoded video frames according to the subsequence image identifiers to obtain the corresponding target decoded video frame sequence.

In an embodiment, When the target stitching manner is the spatial stitching manner, the video frame stitching module 2006 is further configured to obtain a current decoding resolution corresponding to the subsequence decoded video frames of each of the subsequence video image groups, process subsequence decoded video frames with the same frame number according to the current decoding resolution to obtain corresponding intermediate subsequence decoded video frames, a resolution of the intermediate subsequence decoded video frames being higher than the current decoding resolution, and upsample the intermediate subsequence decoded video frames to obtain the corresponding target decoded video frame sequence.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 23:
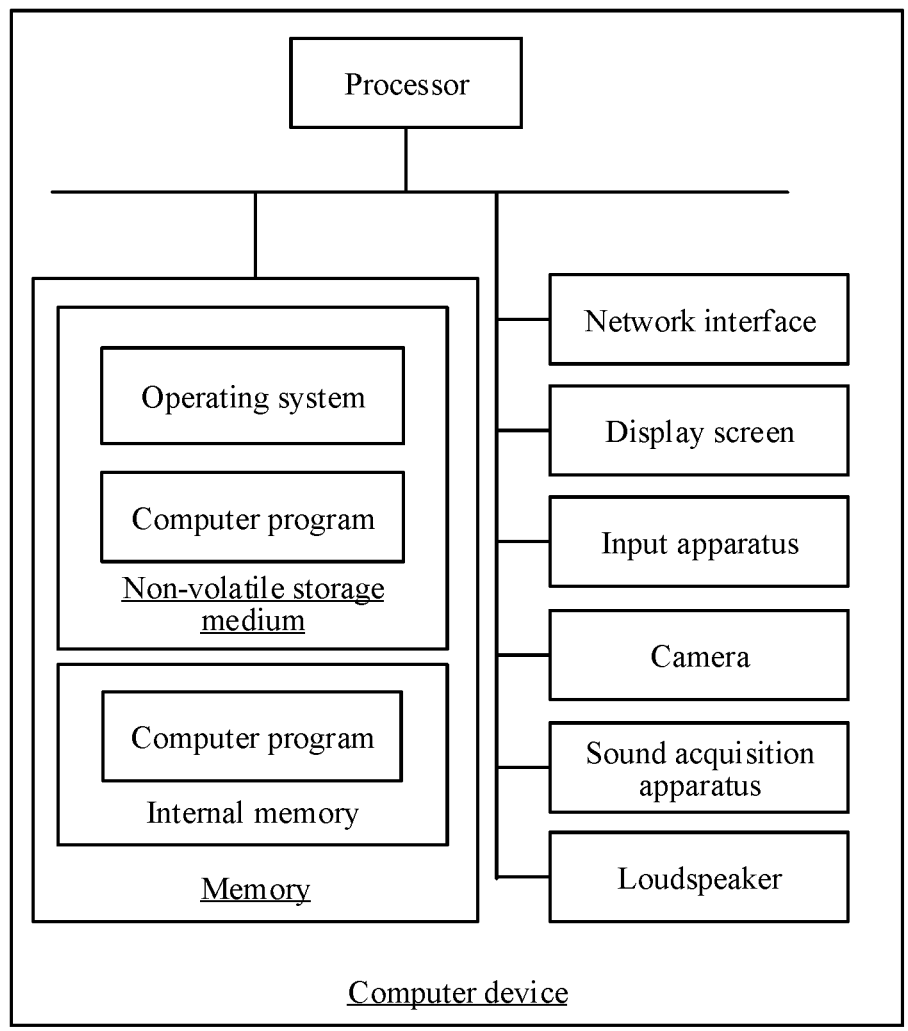
FIG. 23 is a structural block diagram of a computer device according to an embodiment.

FIG. 23 is a diagram of an internal structure of a computer device according to an embodiment. The computer device may be specifically the terminal 110 or the server 120 in FIG. 1. As shown in FIG. 23, the computer device includes a processor, a memory, a network interface, an input apparatus, and a display screen that are connected by a system bus. The memory includes a non-volatile storage medium and an internal memory. The non-volatile storage medium of the computer device stores an operating system and may further store a computer program, the computer program, when executed by the processor, causing the processor to implement the video encoding method or the video decoding method. The internal memory may also store a computer program, the computer program, when executed by the processor, causing the processor to implement the video encoding method or the video decoding method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

A person skilled in the art may understand that, the structure shown in FIG. 23 is merely a block diagram of a part of a structure related to a solution of this application and does not limit the computer device to which the solution of this application is applied. Specifically, the computer device may include more or fewer components than those in the drawings, or include a combination of some components, or include different component layouts.

In an embodiment, the video encoding apparatus or the video decoding apparatus provided in this application may be implemented in a form of a computer program. The computer program may run on the computer device shown in FIG. 23. The memory in the computer device may store program modules forming the video encoding apparatus or the video decoding apparatus, for example, the video data obtaining module, the video data processing module, the encoding manner obtaining module, and the subsequence video image group encoding module shown in FIG. 16. The computer program formed by the program modules causes the processor to perform the steps of the video encoding method in the embodiments of this application that are described in this specification. For example, the target encoded data receiving module, the encoded data decoding module, and the video frame stitching module shown in FIG. 20. The computer program formed by the program modules causes the processor to perform the steps of the video decoding method in the embodiments of this application that are described in this specification.

For example, the computer device shown in FIG. 23 may obtain video data by using the video data obtaining module in the video encoding apparatus shown in FIG. 16, the video data including a plurality of original video images. The video data processing module processes the video data according to a sequence generation rule to obtain a plurality of independent subsequence video image groups, each of the subsequence video image groups including subsequence images corresponding to the sequence generation rule. The encoding manner obtaining module obtains encoding manners corresponding to the subsequence video image groups. The subsequence video image group encoding module independently encodes the corresponding subsequence video image groups according to the encoding manners to obtain subsequence video encoded data corresponding to each of the subsequence video image groups.

For example, the computer device shown in FIG. 23 may receive target encoded data returned by a video transmitting terminal according to a network status of a video requesting terminal by using the target encoded data receiving module in the video decoding apparatus shown in FIG. 20, the target encoded data including subsequence video encoded data corresponding to a subsequence video image group, and a total quantity of the subsequence video image groups matching the network status. The encoded data decoding module independently decodes the subsequence video encoded data corresponding to the subsequence video image groups to obtain subsequence decoded video frames corresponding to each of the subsequence video image groups. The video frame stitching module stitches the subsequence decoded video frames corresponding to the subsequence video image groups to obtain a corresponding target decoded video frame sequence.

In an embodiment, a computer device is provided, including a memory and a processor, the memory storing a computer program, the computer program, when executed by the processor, causing the processor to perform operations of the foregoing video encoding method or the video decoding method. The operations of the video encoding method or the video decoding method herein may be operations of the video encoding method or the video decoding method in the foregoing embodiments.

In an embodiment, a computer-readable storage medium is provided, storing a computer program, the computer program, when executed by a processor, causing the processor to perform operations of the video encoding method or the video decoding method. The steps in the video encoding method or the video decoding method herein may be steps in the video encoding method or the video decoding method in the foregoing embodiments.

A person of ordinary skill in the art may understand that all or some of procedures of the methods in the foregoing embodiments may be implemented by a computer program instructing relevant hardware. The program may be stored in a non-volatile computer-readable storage medium. When the program is executed, the procedures of the foregoing method embodiments may be included. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the foregoing embodiment are described. However, provided that combinations of the technical features do not conflict with each other, the combinations of the technical features are considered as falling within the scope recorded in this specification.

The foregoing embodiments show only several implementations of this application and are described in detail, which, however, are not to be construed as a limitation to the patent scope of this application. A person of ordinary skill in the art may further make variations and improvements without departing from the ideas of this application, which all fall within the protection scope of this application. Therefore, the protection scope of this application is subject to the appended claims.

What is claimed is:

1. A video encoding method, applicable to a computer device, the method comprising:
    obtaining video data, the video data comprising a plurality of original video images;
    processing the video data according to a sequence generation rule to obtain a plurality of subsequence video image groups, each of the subsequence video image groups comprising subsequence images extracted from the original video images according to the sequence generation rule;
    obtaining encoding manners corresponding to the subsequence video image groups;
    encoding the corresponding subsequence video image groups according to the encoding manners to obtain corresponding subsequence video encoded data of the subsequence video image groups;
    obtaining a target subsequence quantity representing a number of subsequence video image groups;
    selecting target subsequence video image groups corresponding to the target subsequence quantity; and
    combining subsequence video encoded data corresponding to the target subsequence video image groups to generate target encoded data,
    wherein obtaining the target subsequence quantity comprises:
        receiving a video request transmitted by a video requesting terminal, the video request carrying a requested subsequence quantity determined according to a network status of the video requesting terminal; and
        determining the requested subsequence quantity as the target subsequence quantity.

2. The method according to claim 1, further comprising:
    adjusting the requested subsequence quantity according to a network status of a video transmitting terminal; and
    determining the adjusted requested subsequence quantity as the target subsequence quantity.

3. The method according to claim 1, wherein the sequence generation rule comprises a temporal generation rule, and wherein processing the video data according to the sequence generation rule comprises extracting the subsequence images from the original video images according to an extraction interval.

4. The method according to claim 3, wherein processing the video data according to the sequence generation rule to obtain the plurality of subsequence video image groups comprises:
    obtaining a total quantity of the subsequence video image groups;
    obtaining a group identifier corresponding to each of the subsequence video image groups;
    determining target subsequence image identifiers corresponding to each of the subsequence video image groups according to the total quantity of the subsequence video image groups and the group identifier corresponding to each of the subsequence video image groups; and
    extracting the subsequence images corresponding to each of the subsequence video image groups from the original video images according to the target subsequence image identifiers corresponding to each of the subsequence video image groups and frame identifiers corresponding to the original video images.

5. The method according to claim 1, wherein the sequence generation rule comprises a spatial generation rule, and wherein processing the video data according to the sequence generation rule comprises downsampling the original video images to obtain the subsequence images.

6. The method according to claim 5, wherein processing the video data according to the sequence generation rule to obtain the plurality of subsequence video image groups comprises:
    downsampling each of the original video images to obtain a video subframe set corresponding to each of the original video images, the video subframe set comprising a plurality of video subframes with the same resolution;
    determining video subframe numbers corresponding to the plurality of video subframes in each of the video subframe sets according to the same rule; and
    sequentially grouping, according to an order of the original video images, a plurality of video subframes with the same video subframe number corresponding to the original video images into the same subsequence video image group.

7. The method of claim 1, wherein the plurality of subsequence video image groups are independent to each other, and the corresponding subsequence video image groups are encoded independently.

8. A non-transitory computer-readable storage medium, storing at least one computer program, the at least one computer program, when executed by at least one processor, causing the at least one processor to perform the steps comprising:
- obtaining video data, the video data comprising a plurality of original video images;
- processing the video data according to a sequence generation rule to obtain a plurality of subsequence video image groups, each of the subsequence video image groups comprising subsequence images extracted from the original video images according to the sequence generation rule;
- obtaining encoding manners corresponding to the subsequence video image groups; and
- encoding the corresponding subsequence video image groups according to the encoding manners to obtain corresponding subsequence video encoded data of the subsequence video image groups;
- obtaining a target subsequence quantity representing a number of subsequence video image groups;
- selecting target subsequence video image groups corresponding to the target subsequence quantity; and
- combining subsequence video encoded data corresponding to the target subsequence video image groups to generate target encoded data,
- wherein obtaining the target subsequence quantity comprises:
- receiving a video request transmitted by a video requesting terminal, the video request carrying a requested subsequence quantity determined according to a network status of the video requesting terminal; and
- determining the requested subsequence quantity as the target subsequence quantity.

9. The non-transitory computer-readable storage medium of claim 8, wherein the plurality of subsequence video image groups are independent to each other, and the corresponding subsequence video image groups are encoded independently.

10. A computer device, comprising at least one memory and at least one processor, the at least one memory storing at least one computer program, the computer program, when executed by the at least one processor, causing the at least one processor to perform operations of the method of claim 1.

11. A video encoding method, applicable to a computer device, the method comprising:
- obtaining video data, the video data comprising a plurality of original video images;
- processing the video data according to a sequence generation rule to obtain a plurality of subsequence video image groups, each of the subsequence video image groups comprising subsequence images extracted from the original video images according to the sequence generation rule;
- obtaining encoding manners corresponding to the subsequence video image groups;
- encoding the corresponding subsequence video image groups according to the encoding manners to obtain corresponding subsequence video encoded data of the subsequence video image groups,
- wherein the sequence generation rule comprises a spatial generation rule, and wherein processing the video data according to the sequence generation rule to obtain a plurality of subsequence video image groups comprises:
- downsampling each of the original video images to obtain a video subframe set corresponding to each of the original video images, the video subframe set comprising a plurality of video subframes with the same resolution;
- determining video subframe numbers corresponding to the plurality of video subframes in each of the video subframe sets according to the same rule; and
- sequentially grouping, according to an order of the original video images, a plurality of video subframes with the same video subframe number corresponding to the original video images into the same subsequence video image group.

12. The method according to claim 11, wherein after obtaining the corresponding subsequence video encoded data of the subsequence video image groups, the method further comprises:
- obtaining a target subsequence quantity representing a number of subsequence video image groups;
- selecting target subsequence video image groups corresponding to the target subsequence quantity; and
- subsequence video combining encoded data corresponding to the target subsequence video image groups to generate target encoded data.

13. The method according to claim 12, wherein obtaining the target subsequence quantity comprises:
- receiving a video request transmitted by a video requesting terminal, the video request carrying a requested subsequence quantity determined according to a network status of the video requesting terminal; and
- determining the requested subsequence quantity as the target subsequence quantity.

14. The method according to claim 13, further comprising:
- adjusting the requested subsequence quantity according to a network status of a video transmitting terminal; and
- determining the adjusted requested subsequence quantity as the target subsequence quantity.

15. The method of claim 11, wherein the plurality of subsequence video image groups are independent to each other, and the corresponding subsequence video image groups are encoded independently.

16. A non-transitory computer-readable storage medium, storing at least one computer program, the at least one computer program, when executed by at least one processor, causing the at least one processor to perform operations of the method of claim 11.

17. A computer device, comprising at least one memory and at least one processor, the at least one memory storing at least one computer program, the computer program, when executed by the at least one processor, causing the at least one processor to perform operations of the method of claim 11.

* * * * *